United States Patent
Nimbalkar et al.

(10) Patent No.: US 12,460,538 B2
(45) Date of Patent: Nov. 4, 2025

(54) SYSTEM AND METHOD FOR CONTROLLING ARTIFICIAL LIFT UNITS

(71) Applicant: Weatherford Technology Holdings, LLC, Houston, TX (US)

(72) Inventors: Manoj M. Nimbalkar, Houston, TX (US); Bimal Venkatesh, Katy, TX (US); Ryan S. Ackerman, San Luis Obispo, CA (US); Dean A. Calder, Kingwood, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 333 days.

(21) Appl. No.: 17/769,831

(22) PCT Filed: Oct. 30, 2020

(86) PCT No.: PCT/US2020/058261
§ 371 (c)(1),
(2) Date: Apr. 18, 2022

(87) PCT Pub. No.: WO2021/091792
PCT Pub. Date: May 14, 2021

(65) Prior Publication Data
US 2022/0381120 A1  Dec. 1, 2022

Related U.S. Application Data

(60) Provisional application No. 62/931,071, filed on Nov. 5, 2019.

(51) Int. Cl.
G05B 19/418 (2006.01)
E21B 47/009 (2012.01)
(Continued)

(52) U.S. Cl.
CPC .......... *E21B 47/009* (2020.05); *F04B 47/028* (2013.01); *G05B 13/0265* (2013.01); *G05B 19/41875* (2013.01); *F04B 49/065* (2013.01)

(58) Field of Classification Search
CPC ............... E21B 47/008; E21B 2200/20; E21B 2200/22; G06N 20/00; G06N 3/02;
(Continued)

(56) References Cited

U.S. PATENT DOCUMENTS

| | | |
|---|---|---|
| 5,291,777 A | 3/1994 | Chang et al. |
| 5,464,058 A | 11/1995 | McCoy et al. |

(Continued)

FOREIGN PATENT DOCUMENTS

| | | |
|---|---|---|
| CN | 102541026 A | 7/2012 |
| CN | 205844898 U | 12/2016 |

(Continued)

OTHER PUBLICATIONS

International Search Report issued Feb. 21, 2021 in counterpart International PCT Application No. PCT/US2020/058261.

(Continued)

*Primary Examiner* — Darrin D Dunn
(74) *Attorney, Agent, or Firm* — Cabello Hall Zinda, PLLC

(57) ABSTRACT

A system and method controls a plurality of artificial lift units at a plurality of wellsites. Processing equipment installs at a plurality of the wellsites. Operating parameters of each of the artificial lift units are obtained with sensing equipment at the wellsites and are communicated in real-time from the wellsites to the installed processing equipment at the plurality of the wellsites. A modelling function of the processing equipment analyzes a trend of the operating parameters of the artificial lift units, and automated machine learning of the processing equipment predicts a condition of (Continued)

at least one of the artificial lift units based on the analyzed trend. The processing equipment determines at least one automated control for the determined condition of the at least one artificial lift unit and counters the determined condition by implementing the at least one automated control at the at least one artificial lift unit.

21 Claims, 22 Drawing Sheets

(51) Int. Cl.
*F04B 47/02* (2006.01)
*G05B 13/02* (2006.01)
*F04B 49/06* (2006.01)

(58) Field of Classification Search
CPC .... G05B 15/02; G05B 23/024; G05B 19/042; G05B 13/041; G05B 13/048; G05B 13/0265; G05B 13/028; G05B 13/04; G05B 19/4184; G05B 2219/31433; G05B 23/0235; G05B 23/0283
See application file for complete search history.

(56) References Cited

U.S. PATENT DOCUMENTS

| | | | | |
|---|---|---|---|---|
| 6,343,656 | B1* | 2/2002 | Vazquez | F04B 47/02 73/861.43 |
| 7,032,659 | B2 | 4/2006 | Barnes et al. | |
| 7,431,093 | B2* | 10/2008 | Bearden | E21B 41/02 166/372 |
| 9,080,438 | B1 | 7/2015 | McCoy et al. | |
| 11,057,748 | B1* | 7/2021 | Zoller | H04L 41/0893 |
| 2006/0120217 | A1 | 6/2006 | Wu et al. | |
| 2007/0252717 | A1* | 11/2007 | Fielder | F04D 13/10 417/63 |
| 2008/0262737 | A1* | 10/2008 | Thigpen | G01V 1/40 702/9 |
| 2010/0042458 | A1 | 2/2010 | Rashid et al. | |
| 2012/0211228 | A1* | 8/2012 | Troshko | E21B 43/124 166/305.1 |
| 2013/0175030 | A1* | 7/2013 | Ige | G05B 15/02 700/282 |
| 2013/0300574 | A1 | 11/2013 | Gillette, II | |
| 2014/0237487 | A1 | 8/2014 | Prasanna et al. | |
| 2014/0244552 | A1* | 8/2014 | Liu | G06N 20/00 706/12 |
| 2015/0142319 | A1 | 5/2015 | McCoy | |
| 2015/0355216 | A1 | 12/2015 | Girardeau | |
| 2015/0369013 | A1 | 12/2015 | Weatherhead et al. | |
| 2017/0074089 | A1* | 3/2017 | Agarwal | E21B 43/124 |
| 2017/0363088 | A1 | 12/2017 | Nguyen et al. | |
| 2018/0016889 | A1 | 1/2018 | McDonald et al. | |
| 2018/0019983 | A1 | 1/2018 | Tissot et al. | |
| 2018/0298744 | A1 | 10/2018 | Ebrahimi et al. | |
| 2018/0300124 | A1 | 10/2018 | Malladi et al. | |
| 2019/0012492 | A1 | 1/2019 | Pons et al. | |
| 2019/0204467 | A1* | 7/2019 | Curt | E21B 47/13 |
| 2020/0157922 | A1 | 5/2020 | Stout et al. | |
| 2021/0071509 | A1* | 3/2021 | Beck | F04B 49/065 |
| 2021/0081823 | A1* | 3/2021 | Boguslawski | E21B 43/127 |
| 2021/0348490 | A1* | 11/2021 | Wheatley | E21B 47/02 |
| 2021/0348790 | A1* | 11/2021 | Adetola | F24F 11/46 |
| 2022/0090485 | A1 | 3/2022 | Boguslawski | F04D 15/0088 |
| 2022/0170353 | A1* | 6/2022 | Chong | E21B 47/008 |

FOREIGN PATENT DOCUMENTS

| | | |
|---|---|---|
| CN | 108194056 A | 6/2018 |
| WO | 2018165352 A1 | 9/2018 |
| WO | 2019023366 A1 | 1/2019 |

OTHER PUBLICATIONS

Examiner's Report dated Apr. 26, 2021 and issued in counterpart Canadian Patent Application No. 3,060,937.
Examiner's Report dated Jan. 10, 2022 and issued in counterpart Canadian Patent Application No. 3,060,937.
Weatherford. "CygNet® SCADA Platform." Brochure. 2017-2018 Weatherford. 8 pages.
Weatherford. "WellPilot® Flow Control Technology." Brochure. 2018 Weatherford. 8 pages.
First Examination Report issued Oct. 29, 2021 in counterpart GCC Patent Application No. 2020-40809.
SAS. "Improve artificial lift strategy, reliability and efficiency with predictive analytics." Solution Brief. 2015. sas.com/pilgas. 2 pages.
Southern, David J. et al. "The Wireless Wellhead." Gas Well Deliquification Workshop, Feb. 22-24, 2010, Denver, CO. pp. 1-33.
Southern, David J. and Control Microsystems, Inc. "Multi-Wellpad Distributed Production Optimization Architecture." Gas Well Deliquification Workshop, Feb. 27-Mar. 2, 2011, Denver, CO. pp. 1-35.
Weatherford. "WellPilot® Controllers for Rod Pump Optimization." 2016-2017. pp. 1-12.
Khan: "A Reliable Internet Of Things Based Architecture For Oil and Gas Industry", 2017 19th International Conference on Advanced Communication Technology (Icactl Global IT Research Institute—GIRi, Feb. 19, 2017 (Feb. 19, 2017), pp. 705-710.

* cited by examiner

SYSTEM AND METHOD FOR CONTROLLING ARTIFICIAL LIFT UNITS

CROSS-REFERENCE TO RELATED APPLICATIONS

This application claims the benefit of U.S. Provisional Appl. No. 62/931,071 filed 5 Nov. 2019, which is incorporated herein by reference in its entirety.

BACKGROUND OF THE DISCLOSURE

Many hydrocarbon wells are unable to produce at commercially viable levels without assistance in lifting the formation fluids to the earth's surface. For this reason, various forms of artificial lift are used at wellsites to produce from these types of wells.

For example, reciprocating pump systems, such as sucker rod pump units, extract fluids from a well and employ a downhole pump connected to a driving source at the surface. A rod string connects the surface driving force to the downhole pump in the well. When operated, the driving source cyclically raises and lowers the downhole pump, and with each stroke, the downhole pump lifts well fluids toward the surface.

In another example, a gas injection unit may be used. In yet another example, a well that produces oil, gas, and water may be assisted in the production of fluids with a hydraulic jet pump. This type of system typically includes a surface power fluid system, a prime mover, a surface pump, and a downhole jet pump. Another lift type—PCP—has a surface pumping unit attached to a downhole pump through a rod system rotating the rods to rotate the downhole pump to bring fluid to surface.

The artificial lift units at the wellsites should be properly monitored and controlled to meet the given well condition. The monitoring and control requires a number of calculations that account for fluid densities and viscosities, presence of gas, and other conditions that have an effect on what pressures the artificial lift unit may encounter downhole.

Typically, desktop software programs are used to set up and configure the operation of the artificial lift units at the wellsites to provide optimization and to perform analytics. To first configure the units, a user inputs information about the particular implementation into the program, which then calculates various results. This is normally done in an office setting. The results are then communicated to operators in the field who then configure the artificial lift unit so the unit can begin operating properly. Over time, however, the efficiency of the artificial lift units decreases due to the changing conditions in the well, changes in the system, installation errors, and the like.

Eventually, the artificial lift units no longer operate efficiently, and production for the wells declines. The units may also need repair, may become damaged, may fail, or the like. At some point, the field operators must then provide updated information of the units, their operation, well production, etc. to office operators so the updated information can be input again into the desktop software programs and updated configuration results can be calculated for relay back to the field. As would be expected, there can be considerable delay in getting correct information to and from the wellsites, running the software programs, and then getting the results back to wellsites to adjust the units. Often, there is breakdown in communication. Moreover, in some instances, the software is only used during the initial set up, and the artificial lift units may only rarely be optimized, which can lead to failures and lost production.

When production efficiency drops, field operators need to adjust or repair the artificial lift units. In some cases, the units may have to be shut down or set to a maintenance mode to allow for repairs of the units and their components. Before production at full capacity can be resumed, components of the artificial lift units may be removed from the wellbore, and damaged components may need to be replaced with other components. This typically involves waiting for the replacement components to be shipped as well as service equipment to travel to location, which can result in significant downtime and production loss.

Currently, existing control system that monitor artificial lift units at wellsites may be able to only give indication of a problem once it has occurred. Even then, the existing control systems may only be able to communicate issues at wellsites through standard polling by SCADA systems. Data cannot be analyzed on location, and changes to the artificial lift unit cannot be made at the wellsite using well modelling control without manual intervention. Instead, maintenance personnel must inspect the artificial lift unit once an alarm is issued. Then, wellsite modelling is run manually by engineering teams to determine what changes need to be made.

Due to the limitations of current control systems, any automated changes to the controls at the wellsite are typically restricted to daily updates on request. For more complex issues, manual analysis and intervention are performed from a central location. In some cases, data is communicated at regular intervals regardless of the necessity of the request. Without a robust historian, data may also be lost during communication failures or during infrequent polling by the central location.

What is needed is a control system that helps configure, operate, and optimize artificial lift units in real time. To that end, the subject matter of the present disclosure is directed to overcoming, or at least reducing the effects of, one or more of the problems set forth above.

The subject matter of the present disclosure is directed to overcoming, or at least reducing the effects of, one or more of the problems set forth above.

SUMMARY OF THE DISCLOSURE

According to the present disclosure, a method is directed to controlling a plurality of artificial lift units at a plurality of wellsites. The artificial lift units have installed controllers, installed sensing equipment, and installed communication systems. The method comprises: interfacing distributed processing equipment with the installed controllers and the installed communication systems at the plurality of the wellsites; connecting the distributed processing equipment together in one or more networks; obtaining, at the distributed processing equipment, operating parameters of each of the artificial lift units from the installed sensing equipment at the wellsites in real time; analyzing, with modelling functions of the distributed processing equipment, trends of the operating parameters of the artificial lift units; predicting, with automated machine learning of the distributed processing equipment, conditions of the artificial lift units based on the analyzed trends; determining, with the processing equipment, automated controls for the determined conditions of the at least one artificial lift unit; and countering the determined conditions by configuring instructions to implement the automated controls and communicating the configured instructions from the distributed processing equipment to the installed controllers.

According to the present disclosure, a programmable control device is directed to controlling a plurality of artificial lift units at a plurality of wellsites. The artificial lift units have installed controllers, installed sensing equipment, and installed communication systems. The programmable storage device has program instructions stored thereon for causing distributed processing equipment to: interface the distributed processing equipment with the installed controllers and the installed communication systems at the plurality of the wellsites; connect the distributed processing equipment together in one or more networks; obtain, at the distributed processing equipment, operating parameters of each of the artificial lift units from the installed sensing equipment at the wellsites in real time; analyze, with modelling functions of the distributed processing equipment, trends of the operating parameters of the artificial lift units; predict, with automated machine learning of the distributed processing equipment, conditions of the artificial lift units based on the analyzed trends; determine, with the processing equipment, automated controls for the determined conditions of the at least one artificial lift unit; configure instructions to implement the automated controls; and communicate the configured instructions from the distributed processing equipment to the installed controllers to counter the determined conditions.

According to the present disclosure, a system is directed to controlling a plurality of artificial lift units at a plurality of wellsites. The artificial lift units has installed controllers, installed sensing equipment, and installed communication systems. The system comprises: communication equipment and distributed processing equipment. The communication equipment has network interfaces in communication with one or more networks and having local interfaces in communication with the installed communication systems. The distributed processing equipment is in communication with the communication equipment, and the distributed processing equipment is installed at the plurality of the wellsites for the artificial lift units. The distributed processing equipment is configured to: obtain operating parameters of each of the artificial lift units from the installed sensing equipment at the wellsites in real time; analyze, with modelling functions of the distributed processing equipment, trends of the operating parameters of the artificial lift units; predict, with automated machine learning of the distributed processing equipment, conditions of the artificial lift units based on the analyzed trends; determine automated controls for the determined conditions of the at least one artificial lift unit; configure instructions to implement the automated controls; and communicate the configured instructions from the distributed processing equipment to the installed controllers to counter the determined conditions.

The subject matter of the present disclosure is directed to overcoming, or at least reducing the effects of, one or more of the problems set forth above.

DETAILED DESCRIPTION OF THE DISCLOSURE

A. Control System

Figure 1:
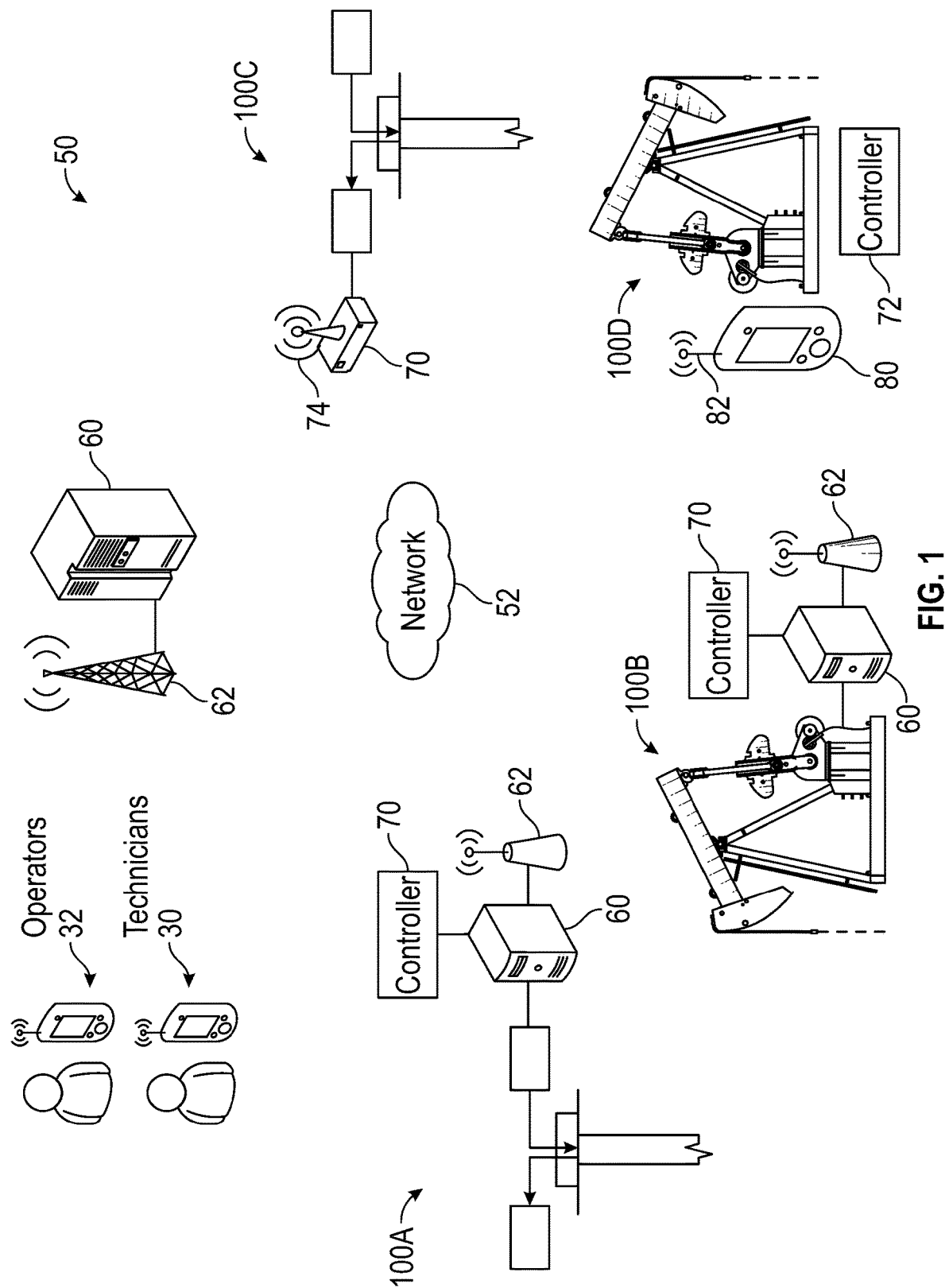
FIG. 1 illustrates a control system according to the present disclosure for monitoring and controlling several artificial lift systems.

Referring to FIG. 1, a control system 50 monitors and controls several artificial lift units 100 at various locations to improve the operations of the various units 100. As will be appreciated, the artificial lift units 100 installed at different wellsites may have different capacities, operating requirements, maintenance schedules, life spans, etc. In fact, the control system 50 can monitor and control a number of types of artificial lift units 100, including hydraulic jet pump (HJP), gas lift (GL), plunger lift (PL), gas assisted plunger lift (GA-PL), reciprocating rod pump (RRP), hydraulic piston pump (HPP), progressive cavity pump (PCP), electronic submersible pump (ESP), etc. Moreover, the artificial lift units 100 may be serviced by different technicians 30 and may be operated by different operators 32.

The control system 50 provides an automated platform that monitors and controls a number of atypical, non-optimal, or deleterious "conditions" that affect the units 100. These conditions can include inefficiencies, low production, damage, alarms, alerts, imbalance, over pumping, under pumping, over injection, under injection, etc., as discussed in more detail herein. The control system 50 helps deal with all of the differences between the types of units 100, technicians 30, operators 32, conditions, and the like by integrating the sensing, monitoring, and control of the artificial lift units 100 in that system's automated platform. To do this, the control system 50 includes control devices 60 integrated throughout the system 50.

In general, some control devices 60 are installed in the field at wellsites, while some control devices 60 are installed remotely at central processing locations or through a cloud computing platform. Each of the control devices 60 in the field generally includes a power input, a processing unit, memory, communication ports, and other electronic components in an environmental housing. Wired and wireless communications can be available. In this way, the control device 60 in the field can be installed as a standalone automation device or as an addition to existing equipment.

Each of the control devices 60 has communication components 62 for communicating information (signals, measurements, controls, user interface screens, graphs, etc.) locally to users and remotely over one or more communication networks 52, which can be wired, wireless, satellite, cellular, or other form of network. The communications of the control devices 60 can be between devices 60 and with users 30, 32, controllers 70 and 72, portable control units 80, and other components disclosed herein.

The communicated information can be shared among the elements of the control system 50. For example, the communicated information can be communicated directly with the technicians 30 and operators 32 or communicated with other control devices 60 for access by the technicians 30 and operators 32. For example, an artificial lift unit 100 having an installed controller 70 can communicate directly with the technicians 30 and operators 32, can communicate with the control device 60, can communicate with a control device 60 of another pumping unit 100, and/or can communicate with a control device 60 designated for multiple units 100. As will be appreciated, these and any number of possible communication arrangements can be used.

The control device 60 provides real-time control for artificial lift units 100. For example, using real-time data, the control device 60 can control each stroke or injection cycle of the artificial lift unit 100. The controls are automated with preset algorithms, which can improve production, increase efficiency, and identify problems. Through the monitoring and control, for example, the control system 50 can reduce over and under pumping in rod-lift units 100 and can reduce over and under injection in gas-lift units 100.

One type of artificial lift unit 100A as shown in FIG. 1 has a control device 60 and a controller 70 to monitor operation of the artificial lift unit 100A. Some of the operational controls provided by the controller 70 can include typical operating instructions, measurements, and other details related to common operation of the artificial lift unit 100A. However, according to the present disclosure, the control device 60 further includes features allowing the artificial lift unit 100A to be monitored and controlled by the control system 50 for conditions so proactive, automated steps can be taken to optimize the artificial lift unit 100A, to alter the unit's operation to account for the condition at least temporarily, to alert the condition to technicians 30 and operators 32, and to perform other functions as disclosed herein. The control device 60 can use its communication equipment 62 to communicate the monitored condition and can receive instructions remotely or locally to handle the condition.

Sensors of the controller 70 can be permanently installed on the artificial lift unit 100. Sensor data is periodically collected by the control device 60 for long term storage. The control device 60 can be used to manage the calculations automatically and to provide remote indication of the monitored conditions. Users (i.e. technicians 30 and operators 32) can use a mobile device in the field or can used remote devices to connect to the control device 60. Users can download data history and can perform other functions. The control device 60 can connect to the network 52 (i.e., cloud) directly for access by the users, to upload history to a web application, etc. The uploaded data can further be used for advanced data analytics.

As another example, one artificial lift unit 1006 as shown in FIG. 1 can be a reciprocating rod pump unit having a control device 60 and a controller 70 to monitor operation of the artificial lift unit 1006. The control device 60 can be part of or can interface with the controller 70 of the artificial lift unit 100.

In yet another example, one artificial lift unit 100C may have a configured controller 70 to monitor operation of the unit 100C. Although the unit 100C may have a controller configured for typical operation and automated control as disclosed herein, the unit 100C may not include a control device 60 that includes specific features allowing the unit 100C to be monitored and controlled for certain conditions so proactive steps can be taken to optimize the unit 100C, to alter its operation to account for the condition at least temporarily, etc. Instead, the controller 70 can use its communication equipment 74 to communicate the monitored conditions and can receive instructions remotely or locally from a control device 60 on the network 52.

Yet another artificial lift unit 100D may have a controller 72 for its typical operation. However, the unit 100D may not include a control device 60, and the controller 72 may not be preconfigured for automated control. Instead, a control device 80 can be used on the unit 100D. The control unit 80 includes features to communicate with a control device 60 to monitor and control for conditions so proactive steps can be taken to optimize the unit 100C, to alter its operation to account for the condition at least temporarily, etc. The control unit 80 can use its communication equipment 82 to send information and receive instructions remotely or locally.

For a gas lift unit 100A such as shown here, the control device 60 can provide high-frequency data logging and storage and instantaneous intelligent alerts via MQTT protocol. The control device 60 can detect slugging, can send intelligent alerts, and autonomously control gas-injection rates.

For rod lift units 1006, 100D, such as shown here in FIG. 1, the control device 60 can detect various conditions, such as balance issues, tagging, gearbox torque, high/low loads, high rod stress, excessive friction, and downhole valve issues. The control device 60 minimizes the need for manual intervention by detecting load violations and receiving notifications on any device. The lift unit 100 can be shut down by the control device 60 based on a detected event or alarm.

The control device 60 can provide high-frequency data logging and storage and can send instantaneous intelligent alerts via MQTT protocol. The control device 60 can autonomously control idle time, detect out-of-balance conditions, identify min/max loads and rod stress, monitor load span, recognize real-time pump card, calculate PIP calculation, and calculate downhole pump card.

Although four types of artificial lift units 100A-D are shown, it will be appreciated that a given artificial lift unit 100 as part of the disclosed system 50 can have other configurations of the salient components disclosed herein with more or less autonomous and manual capabilities.

During operation, one of the artificial lift units 100A-D may develop a certain monitored condition requiring automated control. As just an example, some monitored conditions suitable for automated control of a rod pumping unit include imbalance, tagging, under pumping, over pumping, and others as disclosed herein. Some monitored conditions suitable for automated control of a gas lift unit include under injection, over injection, and others as disclosed herein.

Depending on the configuration of the unit 100A-D, the monitored condition may be communicated remotely for handling or may be handled locally. For example, some of the artificial lift units 100A-B having control devices 60 can determine and handle the condition on their own. The monitored condition can also be communicated to the technicians 30, operators 32, other control devices 60, other units 100, etc. In some circumstances, other units 100C-D may only determine and communicate the monitored condition for handling by a control device 60 on the network 52. Automated controls can be communicated back to the unit 100C for implementation by the properly configured controller 70.

Either way, technicians and operators 30 and 32 can be informed of the monitored condition through the control system 50. Ideally, the artificial lift unit 100A-D can be automatically controlled to correct the monitored condition. On a reciprocating pump unit 100B, for example, over or under pumping conditions can be corrected by an automated control of a variable speed drive of the unit 100B. Should the unit 100B include a variable frequency drive, such as a Weatherford VFD, to provide continuously variable speed control, the control device 60 can automatically access a speed pattern appropriate to ensure the above operation.

If automated control is not possible for the particular condition, the unit 100A-D is preferably quickly serviced manually to correct the condition. On a reciprocating pump unit 100B, for example, counterweights of the unit 100B may need to be repositioned for balance. Usually, operators 30 may be notified that the unit 100B is imbalanced but technicians 32 cannot service the unit 100B at the time or not until some extended period of time later. Automated controls may temporarily be implemented at the unit 100B as a remedial correction until the unit 100B can be manually serviced. For example, the control device 60 can automatically set a pumping speed to ensure that the gearbox will not be overloaded and that the loss of production due to the out-of-balance condition can be minimized.

The control system 50 allows the condition of the artificial lift unit 100A-D to be dealt with when any of a number situations occur. In one option, the control system 50 optimizes the given unit 100A-D by monitoring parameters, performing calculations, determining deleterious conditions, and providing output for automated control of the unit 100A-D. In another option, the control system 50 allows the given artificial lift unit 100A-D to continue operation with less than optimized operations by monitoring parameters, performing calculations, and providing output for modifying operating conditions of the unit 100A-C to maintain safety and minimize production losses until manual repairs or changes can be made.

As can be seen, the control system 50 combines analytical software with hardware at the wellsites having the artificial lift units 100. Using modelling functions, the control system 50 can immediately notify personnel (operators 30, technicians 32, etc.) of wellsite changes and can analyze the data to provide alarms and automated controls without the need for manual intervention.

The control system 50 automates well activities using software rather than hardware alone. Consequently, the control system 50 reduces maintenance costs with predictive analytics. As the wellsites produce, for example, the control system 50 predicts and detects issues early on so operators 30 can proactively plan maintenance, dispatch personnel, extend equipment life, and reduce frequency of failures. Having control devices 60 installed at the wellsites or available through the network communications, the control system 50 reduces maintenance costs using predictive analytics and artificial intelligence to extend mean-time between failures (MTBF) and to reduce downtime and minimize deferred production.

Figure 2:
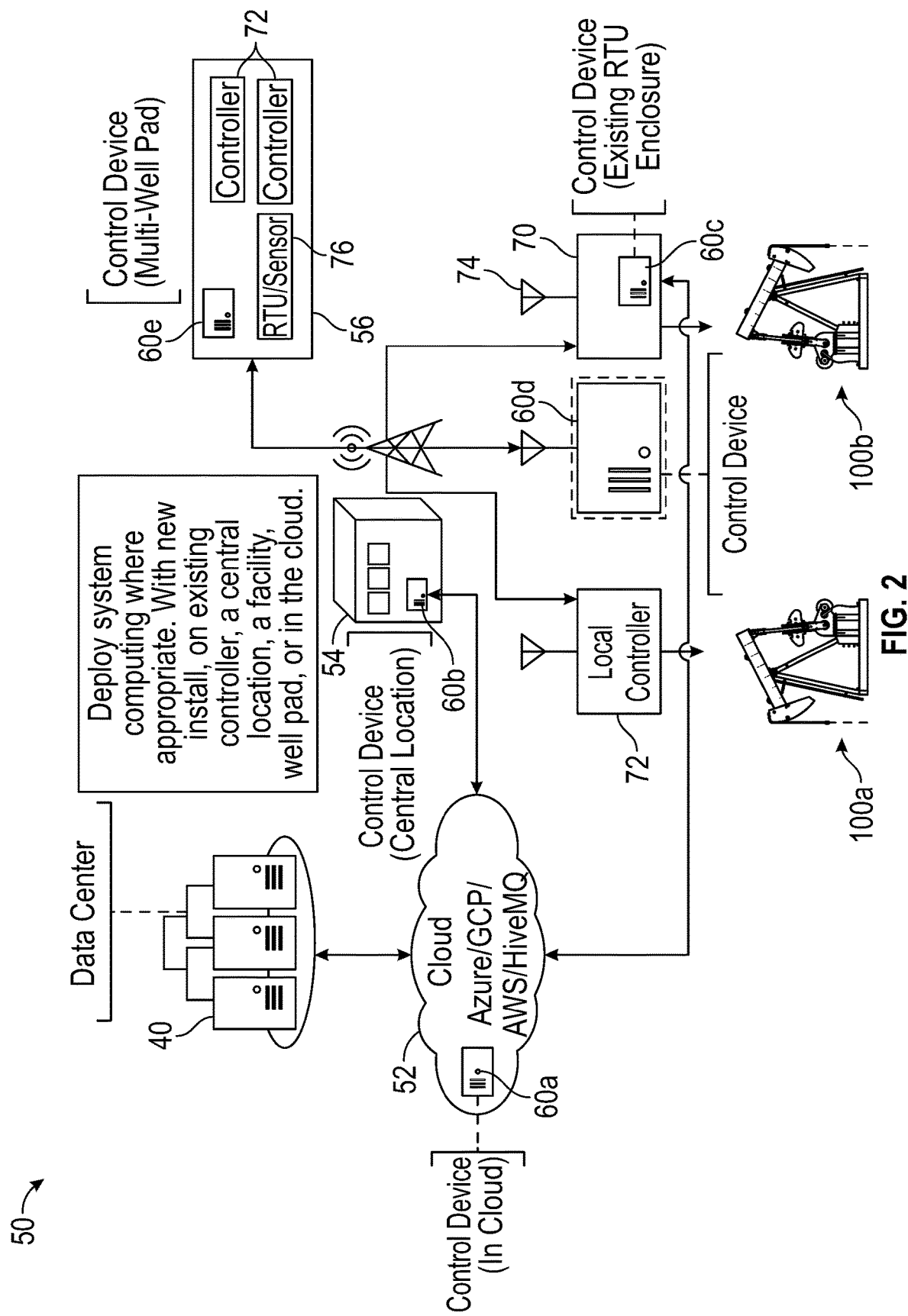
FIG. 2 illustrates the control system of the present disclosure in more detail.

Having an overview of the disclosed control system 50, FIG. 2 illustrates the control system 50 of the present disclosure in additional detail. As already described above, the control system 50 has system computing deployed in a number of locations in a network arrangement. The system computing can be deployed on new installations, in remote terminal units, controllers 70, at a central location 54, at a facility, at a well pad 56, or in the cloud 52. In particular, the control system 50 includes control devices 60a-d disposed throughout the network arrangement. Depending on its processing needs, the control device 60a-e may be a server system to handle monitoring and control of several artificial lift units 100 or may be a computer to handle monitor and control of a specific unit 100.

For example, a control device 60a in the form of a server system or the like can be available in a cloud computing platform 52 of a network. For its part, the cloud platform 52 may be provided by a service platform, such as Microsoft Azure, Google Cloud Platform (GCP), Amazon Web Services (AWS), HiveMQ, and the like.

A control device 60b can be available at a central location 54, such as a service facility. A control device 60c can be available directly at an artificial lift unit 100b having a configured controller 70, and a control device 60d can be in communication with units 100a. Additionally, a control device 60e can be at a multi-well pad 56 having remote terminal units 76 and controllers 72 for units 100. As will be appreciated, such remote terminal units (RTU) are electronic devices having microprocessors that can interface with components at wellsite using a telemetry protocol, such as a SCADA (supervisory control and data acquisition) system or the like. Unlike traditional SCADA systems with limited data storage and scheduled data polling, however, the control devices 60 of the disclosed system 50 store high-frequency data at the wellsite and transmit data in real time to the operator's back-office SCADA system at a data center 40 and/or transmit in real time to the cloud-based platform 52.

The control device 60 can have different hardware configurations, including a first configuration to be used in conjunction with an existing wellsite controller 72 and a second configuration having a configured controller 70 and software. Either way, the control system 50 integrates with preconfigured controllers 70 or retrofits with existing onsite controllers 72.

Unlike traditional SCADA systems with limited data storage and sporadic data pulls, the control system 50 can store unlimited data in the cloud platform 52 and push it to operators 32 in real time. The control system 50 learns from this steady stream of data without programming to optimize parameters of the artificial lift units 100 (e.g., to optimize stroke and pump fillage for a rod lift unit). The control system 50 may only send alerts when needed. Preferably, the control system 50 uses MQTT protocol for high bandwidth data transfer.

Communications in the control system 50 can be via wired communication, wireless communication, radio signal, cellular, satellite, Internet protocol, etc. Client data centers 40 can connect to the control system 50 via the cloud 52. A dedicated control device 60c on an artificial lift unit 100b can communicate to the cloud 52 for access by client data centers 40 and by the central location 54. The dedicated control device 60c may also communicate with the central location 54 or facility 54 via wired or wireless communication.

The control device 60b at the central location 54 may communicate with the cloud 52. For those units 100a lacking a control device 60, the controller 72 of the unit 100a may communicate with the control device 60b at the central location 54, with the control device 60b in communication range, etc. The multi-well pad 56 can have a local control device 60e that can communicate with the remote control device 60b of the central location 54. These and other arrangements of the system computing and network communications can be used in the disclosed control system 50.

B. Control Device and Control Application

Figure 3:
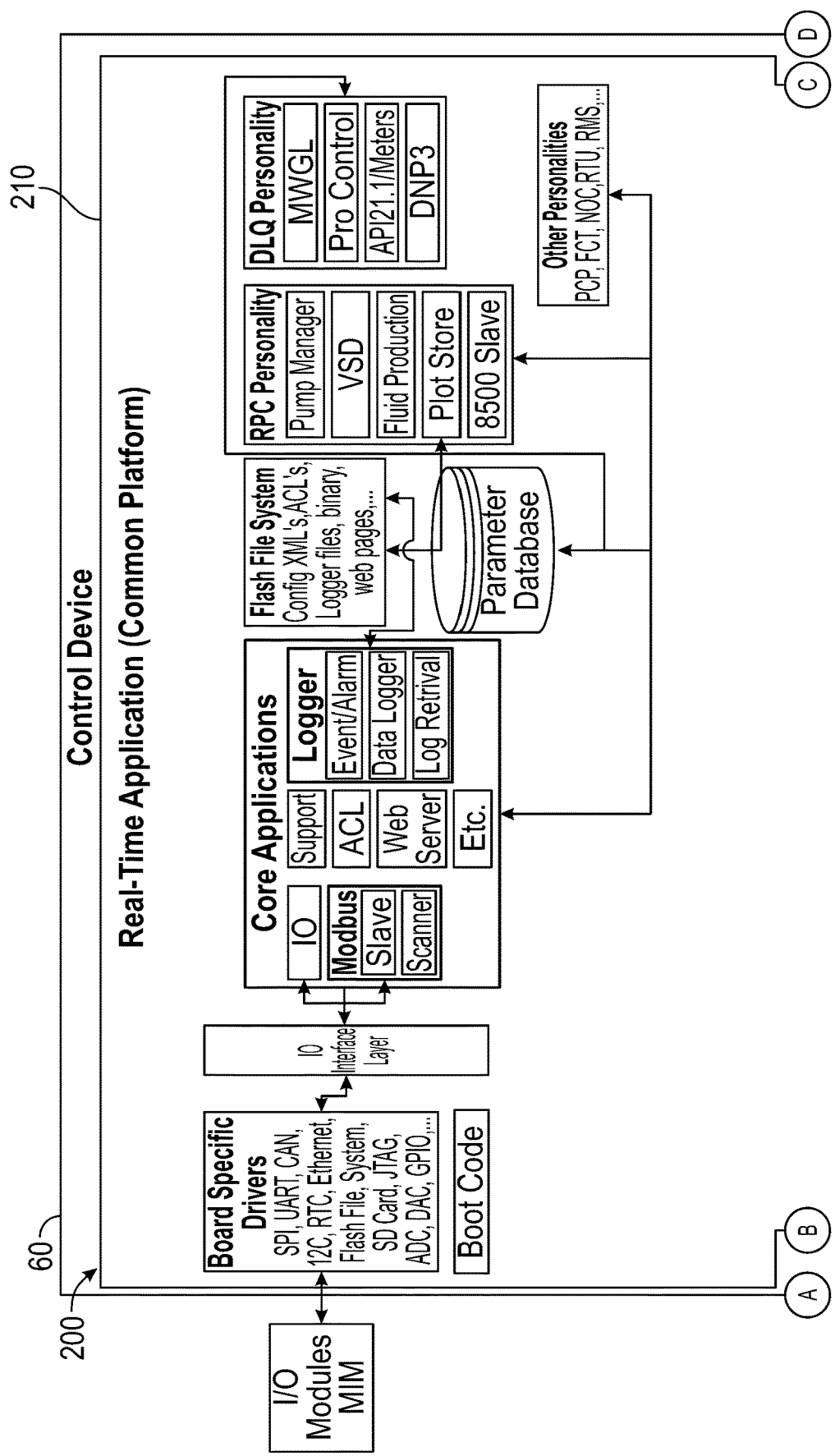
FIG. 3 illustrates a diagram of a control application of the disclosed system.
Figure 3:
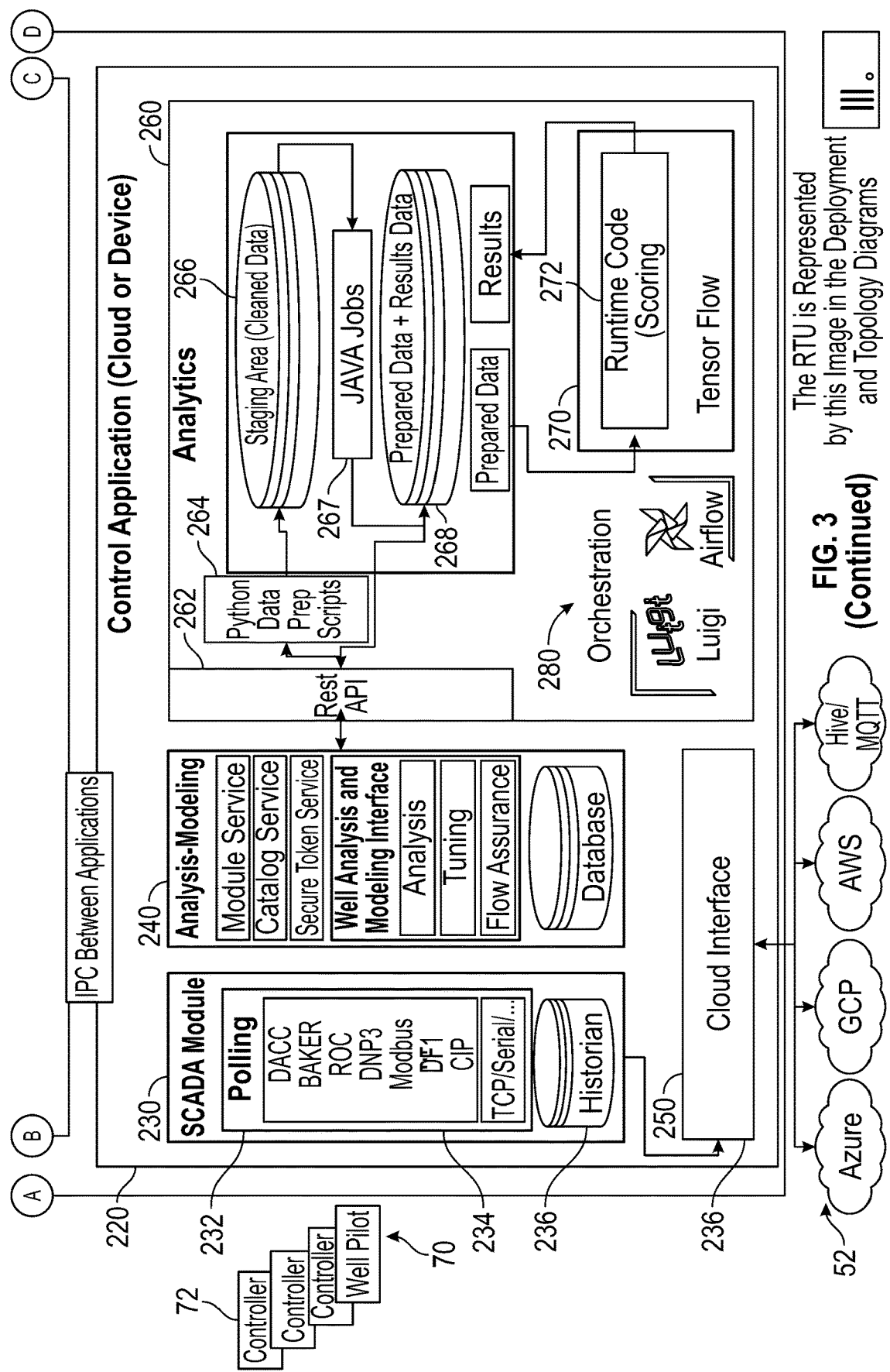

FIG. 3 illustrates a diagram of a system application 200 of the disclosed system. The system application 200 runs on system hardware 202, which includes one or more of a server, a control device, a remote terminal unit, a computer, a laptop, a mobile device, a controller, and the like as disclosed herein depending on the installation. As will be appreciated but not necessarily shown, the system hardware 202 includes a central processing unit, input-output interfaces, communication interfaces, memory, and other necessary components.

The system application 200 includes a real-time application 210 and a control application 220. The real-time application 210 is an existing application suited to the monitoring and operation of an artificial lift unit, such as a reciprocating rod lift (RRL) unit, a deliquification (DLQ) system, a plunger lift unit, a gas lift unit, etc. The real-time application 210 has a layout of components, including board specific drivers, an input-output interface layer, core applications, a flash file system, database, and artificial lift modules. The real-time application 210 is connected to various input-out modules (e.g., MIM) for communication with sensors and the like.

Here, one of the artificial lift modules includes a reciprocating pump controller (RPC) module having a pump manager, variable speed drive, fluid production, plot store, and other functional elements. Another of the artificial lift modules includes a deliquification (DLQ) module having a MWGL, ProControl, and other functional elements. Additional artificial lift modules can include those for progressive cavity pump (PCP), flow control technology (FCT), net oil computer (NOC), remote terminal unit (RTU), etc.

As disclosed herein, features of the control application 220 can be available on the cloud 52 or on the control device 60, as appropriate. The control application 220 includes a supervisory control and data acquisition (SCADA) module 230, an analysis-modelling module 240, a cloud interface 250, and an analytics module 260. Inter-process communications (IPC) are provided between the applications 210 and 220.

The SCADA module 230 can be based on the CYGNET™ SCADA platform that collects and manages diverse data. CYGNET is a trademark of Weatherford Technology Holdings, LLC.) The SCADA module 230 allows the control application 220 to communicate directly with controllers 70 of artificial lift units. The SCADA module 230 includes polling functionality, communication functionality (TCP/Serial/ . . . ), and historian functionality to store data. The SCADA module 230 connects via the cloud interface 250 to the cloud services 52.

The analysis-modelling module 240 includes a module service, a catalog service, a secure token service, a well analysis and modeling interface, and a database. The well analysis and modeling interface provides modelling functions (e.g., algorithms for analysis, tuning, and flow assurance for the artificial lift unit). The analysis-modeling module 240 can detect and generate alarms based on monitored conditions. Alarms for reciprocating rod lift can include alarms related to gear box torque, rod stress, rod tapping, production slugging, and downhole valve issue. Alarms for gas lift can include multi-point injection, shallow injection, etc.

The analytics module 260 performs a number of analytic functions, including predicting well and equipment failures, collecting data, training models on the cloud (52), runtime scoring on the cloud (52), etc. The analytics module 260 communicates with the analysis-modelling module 240 via a Representational State Transfer (REST) application program interface (API) 262. To perform the analytics, data passes through a Python Data Preparation Scripts 264, and cleaned data is stored in a staging area 266. Using Java Jobs 267, the prepared data and results data are stored. This prepared data is input to runtime code (scoring) 272 of machine learning models 270, and results are returned. An example platform for the machine learning models 270 includes TENSORFLOW™, which provides end-to-end open source platform for machine learning. (TENSORFLOW is a trademark of Google LLC.) Other machine learning platforms can be automated according to the present disclosure to predict the conditions of the artificial lift units based on the analyzed trends. Orchestration 280 to build data pipelines of batch jobs is provided for the analytics module 260 by a workflow management system, which can be based on Luigi or Airflow workflow engines.

Maintenance can be planned using the predictive features of the control application 220. Wellsite analytics with direct controller interface using SCADA allows the control application 220 to update setpoints and control the unit's controller 70, 72. By analyzing current data, the control application 220 can monitor and can give immediate notification of intelligent alarms, status changes, and the like. Physics-based models in the modelling functions can be created at the control application 220 on location to enhance/optimize autonomous control. By monitoring and analyzing current data at the wellsite controller 70, 72, the control application 220 application 220 publish data base on data characteristics. Notifications can be predictive as opposed to just being reactive.

The system application 200 on the control device 60 is equipped to run engineering models in real time. The engineering models in the modeling functions are manually configured to provide a digital representation of the well's characteristics, such as equipment, depth, deviations, reservoir characteristics, etc. The system application 200 collects sensor data automatically in real-time and executes the engineering models to produce designated results. These results are utilized by the system application 200 to determine and make changes to well's operating parameters in order to achieve optimization.

For rod lift units 100, the system application 200 collects, analyzes, and automatically historizes every card on location. The system application 200 uses modified Everitt-Jennings analysis and uses automatic pattern matching and recognition to detect anomalies in dynamometer cards. The system application 200 detects changing well conditions based on analysis results, card shape, and trend data, etc. Setpoints can be changed on the dynamometer card. The system application 200 can perform autonomous control, such as automatically adjusting idle time to maximize well efficiencies. The system application 200 can perform downhole analysis for legacy, existing, or installed controllers 72, can infer production values, and perform pump intake pressure (PIP) calculations.

The automated monitoring for rod lift unit 100 can involve high frequency data logging and instant alarm notification via MQTT for controller alarms. Elements that can be monitored and controlled include idle time, min/max structural loads, load span, tagging bottom/top, gearbox load, out-of-balance condition, high rod stress, downhole pump valve issue, excessive friction, pump fillage, pump intake pressure, pump off strokes, load cell drift, position sensor top of stroke (TOS), inferred production error, and others. For those rod lift units having a variable speed drive, elements for monitor and control can further include gas influx control, min/max strokes per minute (SPM), delta speed, and optimal pump fill setpoint.

For gas lift units 100, the system application 200 can monitor and control multiple wells, can perform well test validation, and can tune automatic models to increases model accuracy. Alerts can be generated by the application 200 based on nodal analysis and trend data to alert user of changing conditions. Inferred production can be calculated daily using a tuned well model and current operating conditions. The system application 200 can identify uplift opportunities using following well analysis tools based on well test data or daily operating conditions. The system application 200 can perform autonomous control, such as automatically adjusting injection gas to maximize production.

For gas lift units, elements for monitor can include high frequency data logging and availability, instant alarm notifications via MQTT for controller alarms, and intelligent alerts to determine when a gas lift or natural-flowing well is slugging. Autonomous control of gas injection rate can be provided based on nodal analysis calculations (with actual rate data).

C. Control Device Connectivity

Figure 4:
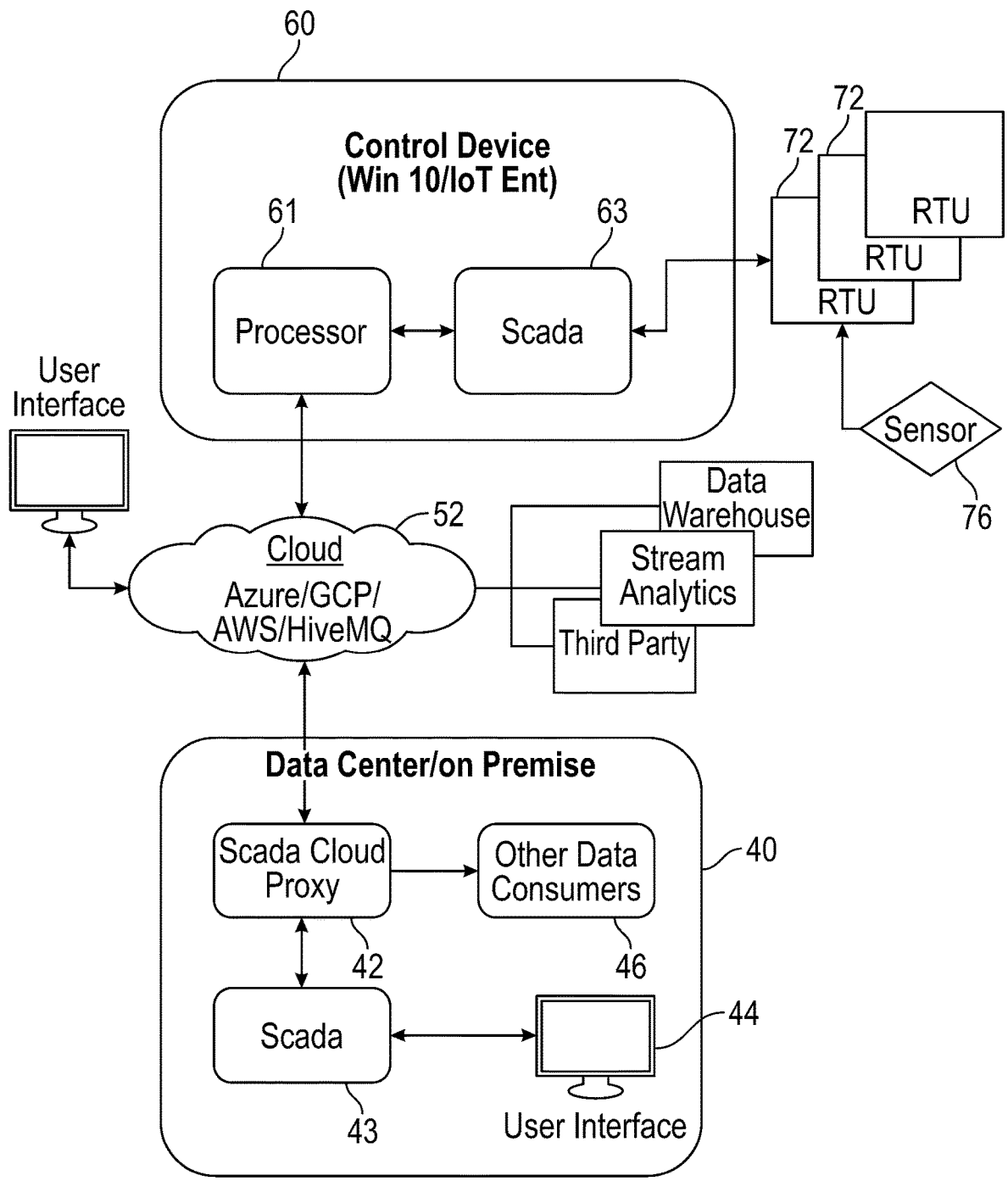
FIG. 4 illustrates a control device used in the disclosed system.

FIG. 4 illustrates a control device 60 used in the disclosed system 50 connected to other remote terminal units 72 having sensors 76 and connected via the cloud 62 to a data center 40. The control device 60 includes a SCADA module 63 and a processor 61. The SCADA module 63 communicates with the remote terminal units 72 of artificial lift units that have their connected sensors 76. The processor 61 communicates with the data center 40 via the cloud 52.

For its part, the data center 40 includes a SCADA cloud proxy 42 that communicates with the cloud 52. A SCADA module 43 allows for users of a system application 44 to communicate with the control device 60. Other data consumers 46 can receive information of the control device 60 via the SCADA cloud proxy 42.

Figure 5:
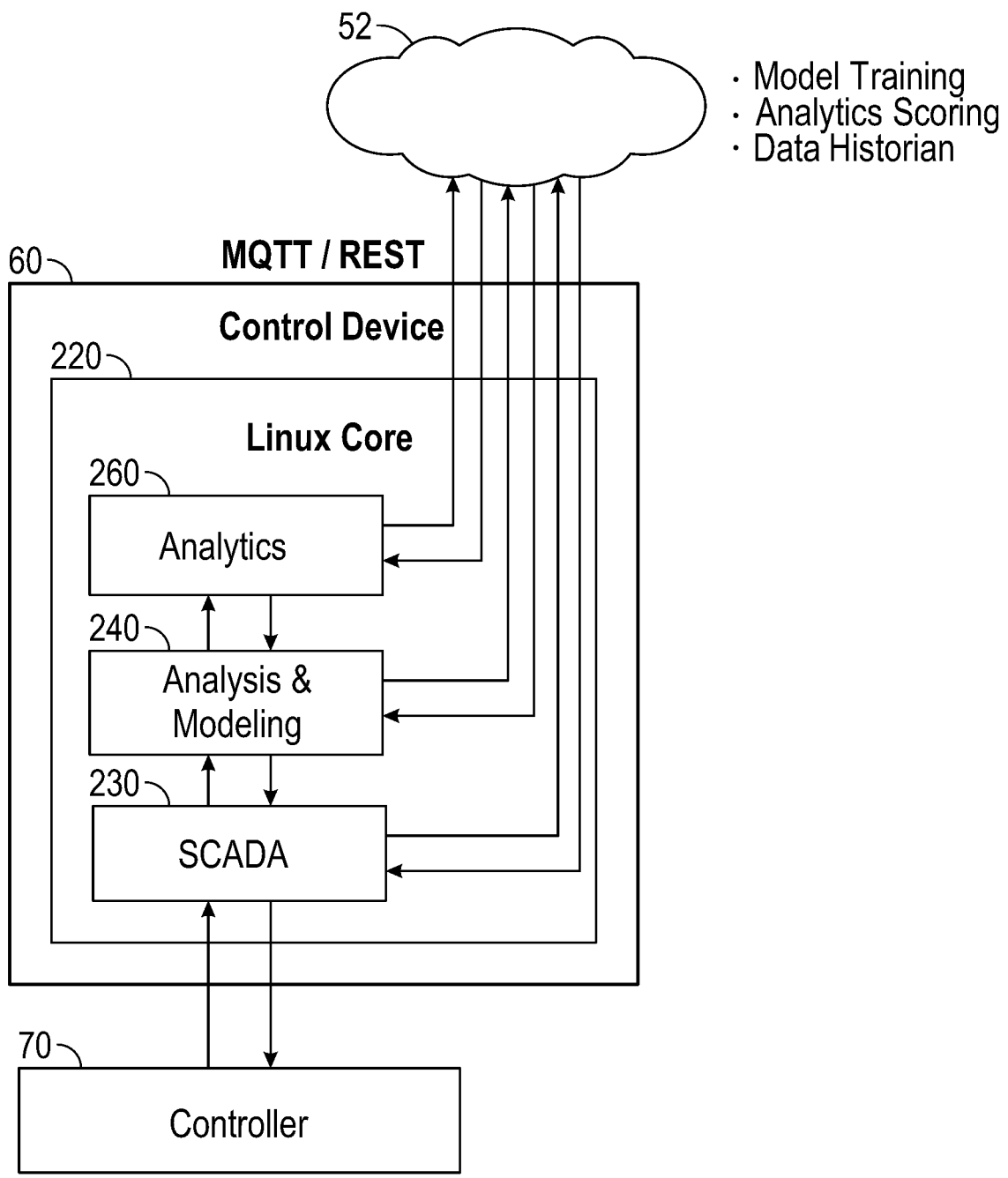
FIG. 5 illustrates one configuration of the control device connected with a local controller compatible to the disclosed system.

FIG. 5 illustrates one configuration of a control device 60 connected with an artificial unit controller 70 compatible to the disclosed system. The control device 60 has a control application 200 having an analytics module 260, an analysis-modelling module 240, and a SCADA module 230, which can run on a Linux core or other platform. Each of the modules 230, 240, and 260 can communicate with the cloud service 52 and can communicate with each other. The SCADA module 230 is used for communicating with the local controller 70, which is compatible with the configured control device 60.

Figure 6:
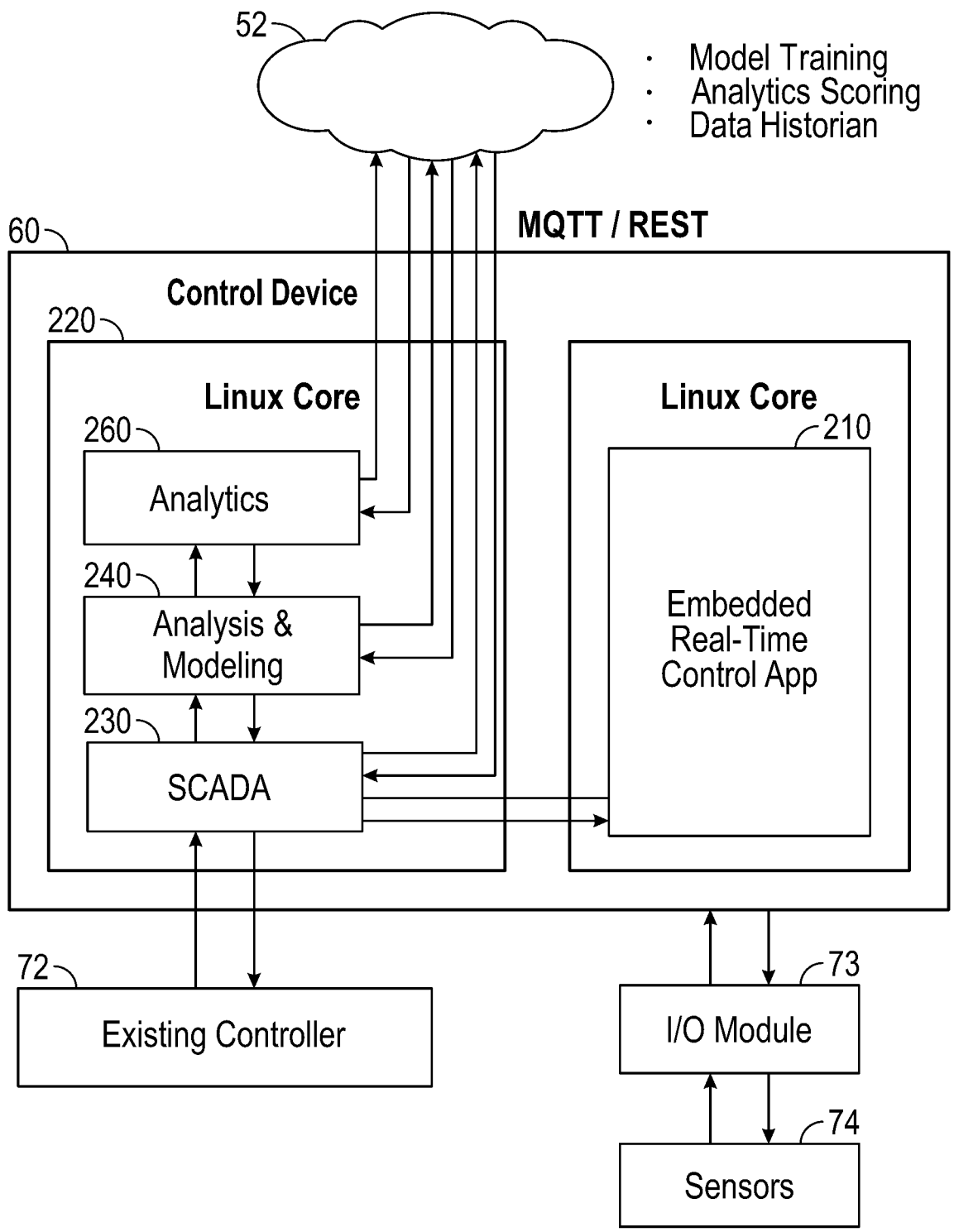
FIG. 6 illustrates another configuration of the control device connected with a local controller retrofitted to the disclosed system.

FIG. 6 illustrates another configuration of a control device 60 connected with a local controller 72 retrofitted to the disclosed system. As before, the control device 60 has a control application 220 having an analytics module 260, an analysis-modelling module 240, and SCADA module 230, which can run on a Linux core or other platform. Each of the modules 230, 240, and 260 can communicate with the cloud service 52 and can communicate with each other. The SCADA module 230 is used for communicating with an existing local controller 72. Here, the SCADA module 230 communicates with the real-time control application 210 of the unit running on a separate Linux core. The control device 60 includes communicates with an input/output module 73 for the local sensors 74 of the artificial lift unit.

D. Control Device

Figure 7:
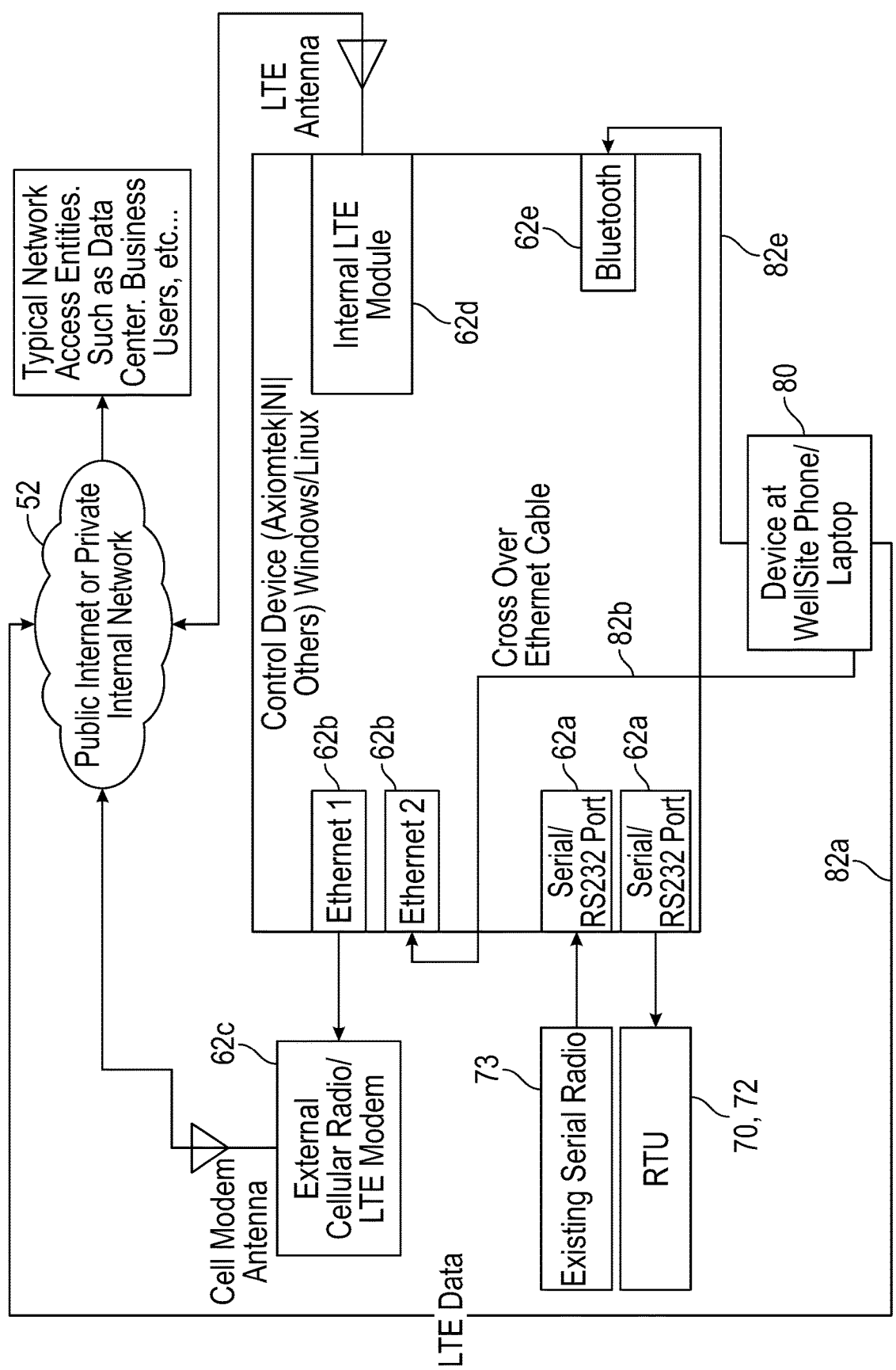
FIG. 7 illustrates the control device in a configuration to communicate with the disclosed system.

Having an understanding of the software of a control device and some of the communications, FIG. 7 illustrates a control device 60 in a configuration to communicate with the disclosed system. The control device 60 includes a number of communication components including serial ports 62*a*, Ethernet ports 62*b*, and wireless modules 62*d-e*. The wireless modules can include a wireless BLUETOOTH® or WIFI module 62*e* and an internal wireless broadband communication or cellular module. (BLUETOOTH is a registered trademark of BLUETOOTH SIG, INC.)

A serial port 62*a* may connect to an existing serial radio 73 at the wellsite. Another serial port 62*a* connects with the remote terminal unit 72 of the artificial unit at the wellsite.

For remote communications, an Ethernet port 62*b* can connect to an external cellular radio or LTE modem 62*c*, which can communicate with public Internet or a private internal network 52. As noted herein, typical entities that can access the network 52 include the data center, business users, etc. Alternatively, the control device 60 may have the internal cellular module 62*d* and antenna to communicate with the network 52.

Local users at the wellsite can use a portable device 80 (e.g., laptop, smartphone, etc.), which can connect to the control device 60 via local wireless connection 82*e* (to wireless module 62*e*) or via wired connection 82*b* (with cross-over Ethernet cable connected to Ethernet port 62*b*). The portable device 80 can also connect with the network 52 via a cellular connection 82*a*.

E. System Connectivity

Figure 8:
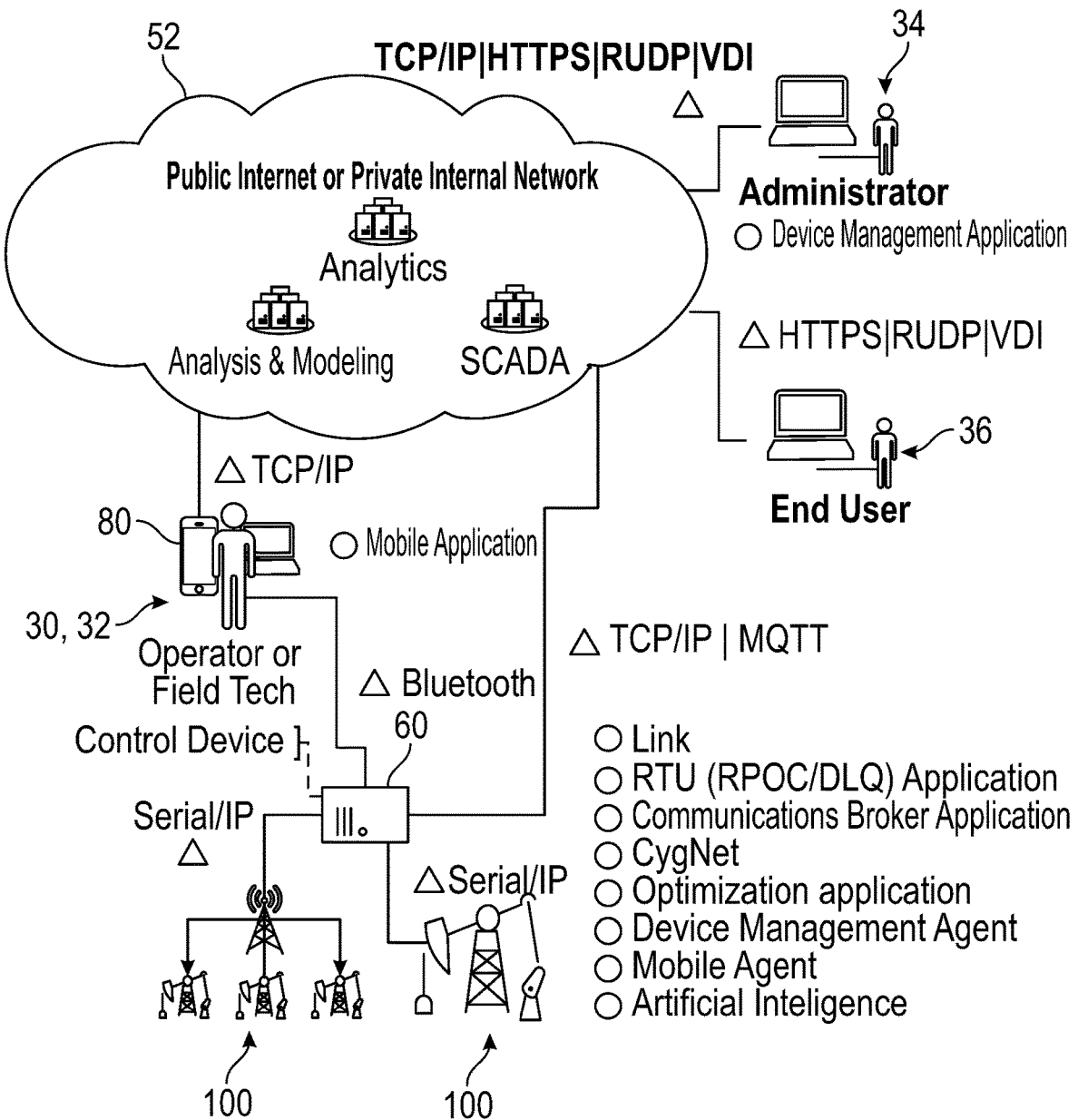
FIG. 8 illustrates portion of the control system with some communication connections.

FIG. 8 illustrates portion of the control system 50 with some further communication connections. As shown, features of the disclosed control system 50 operate in the cloud 52, which can be public Internet or private internal network. For example, analytics, analysis and modelling, SCADA services can operate on the cloud 52. Administrator terminals 34, end user terminals 36, terminals 80 for operators 30 and field technicians 32, and wellsite control devices 60 have various applications and communicate with each other and with the services on the cloud 52 using a number of communication protocols, Transmission Control Protocol/Internet Protocol (TCP/IP), machine-to-machine (M2M)/"Internet of Things" connectivity protocol (MQTT), Hypertext Transfer Protocol Secure (HTTPS), RUDP, Virtual Desktop Infrastructure (VDI), BLUETOOTH, Serial/IP, etc.

For example, system administrator terminals 34 use a device management application and communicate via TCP/IP, HTTPS, RUDP, or VDI to the services on the cloud 52. End user terminals 36 use an end user application and communicate via HTTPS, RUDP, or VDI to the services on the cloud 52. Operators 30 and field technicians 32 use portable terminals 80 with a mobile application to communicate via TCP/IP to the services on the cloud 52 and communicate with the wellsite control device 60 via wired or wireless connections. The control device 60 has a browser interface for onsite configuration and information.

The wellsite control device 60 communicates with the services on the cloud 52 using TCP/IP or MQTT. The wellsite control device 60 can communicate with a serial/IP connection to components of an artificial lift unit 100 or can connect with a serial/IP connection to a cellular or radio connections to artificial lifts units 100. Preferably, the control system 50 uses MQTT publishing for instantaneous notifications, instead of relying only on SCADA polling.

A number of available applications for the system 50 include Link, RTU application, communications broker application, SCADA, optimization application, artificial intelligence application, etc.

Application connectivity can be achieved in a number of ways. In an online use case, the operator 30, technician 32, or other user can be physically located with the control device 60 having Internet connectivity, either through a cell modem or customer radio network. The user can connect to the control device 60 for configuration or status using wireless communications.

In an offline case, the operator 30, technician 32, or other user can be physically located with the control device 60, but neither the user nor the control device 60 may have Internet connectivity. The user can still connect to the control device 60 using local wireless communications (e.g., Bluetooth).

In a proxy use case, the operator 30, technician 32, or other user can be physically located with the control device 60. However, the device 60 does not have Internet connectivity, but the user has Internet connectivity on their phone or tablet and can connect and configure the device 60. In a remote use case, the operator 30, technician 32, or other user is not physically located with the control device 60, but the device 60 has Internet connectivity.

F. Reciprocating Rod Lift Unit

Figure 9:
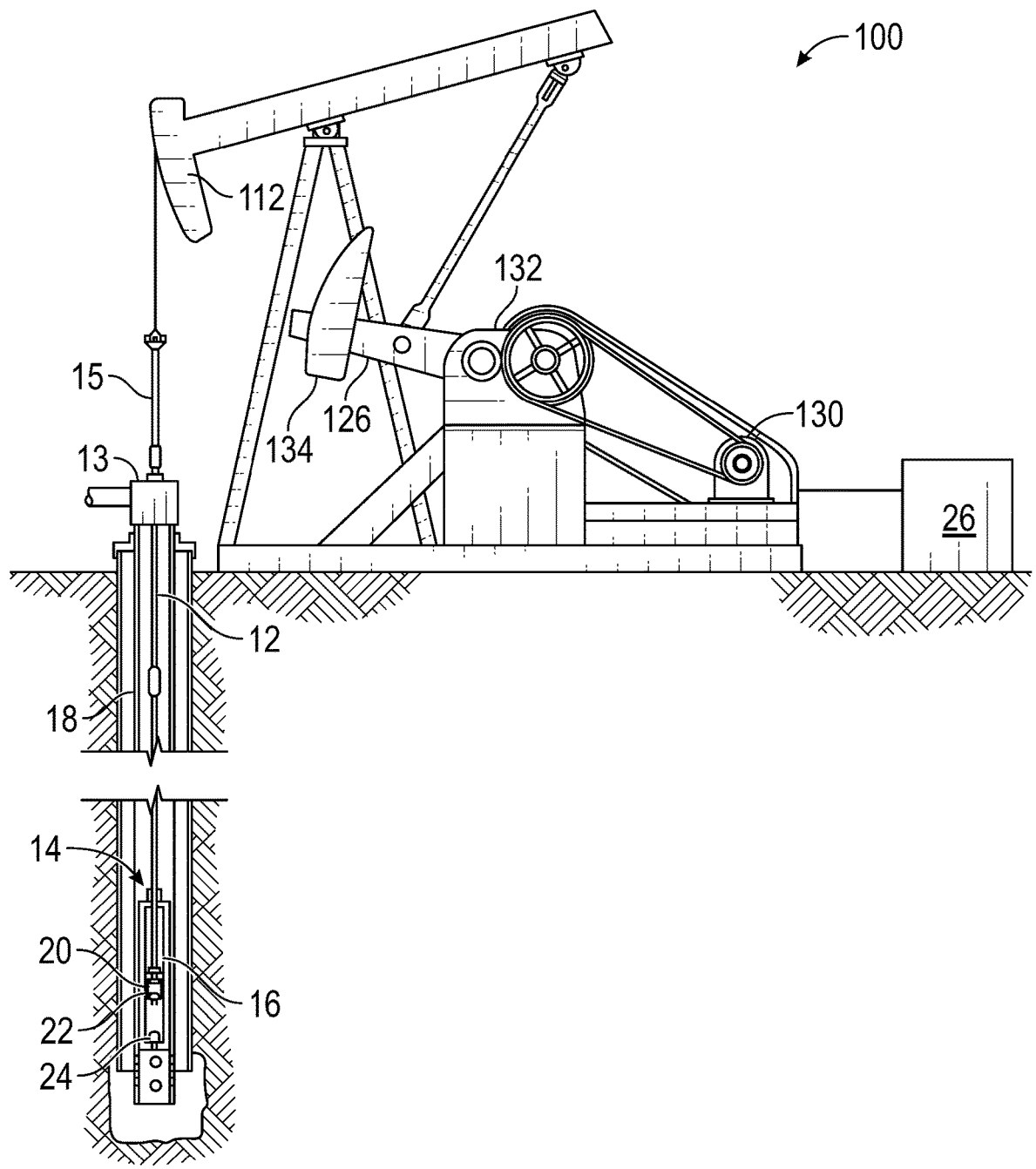
FIG. 9 illustrates an example of a reciprocating rod pump system.

As noted herein, the artificial lift unit 100 can be a reciprocating rod lift unit. For example, FIG. 9 shows a reciprocating rod lift unit 100 used to produce fluid from a well. A downhole pump 14 has a barrel 16 with a standing valve 24 located at the bottom. The standing valve 24 allows fluid to enter from the wellbore, but does not allow the fluid to leave. Inside the pump barrel 16, a plunger 20 has a traveling valve 22 located at the top. The traveling valve 22 allows fluid to move from below the plunger 20 to the production tubing 18 above, but does not allow fluid to return from the tubing 18 to the pump barrel 16 below the plunger 20. A driving source (e.g., a pump jack or pumping unit 112) at the surface connects by a rod string 12 to the plunger 20 and moves the plunger 20 up and down cyclically in upstrokes and downstrokes.

During the upstroke, the traveling valve 22 is closed, and any fluid above the plunger 20 in the production tubing 18 is lifted towards the surface. Meanwhile, the standing valve 24 opens and allows fluid to enter the pump barrel 16 from the wellbore.

At the top of stroke, the standing valve 24 closes and holds in the fluid that has entered the pump barrel 16. Furthermore, throughout the upstroke, the weight of the fluid in the production tubing 18 is supported by the traveling valve 22 in the plunger 20 and, therefore, also by the rod string 12, which causes the rod string 12 to stretch. During the downstroke, the traveling valve opens, which results in a rapid decrease in the load on the rod string 12. The movement of the plunger 20 from a transfer point to the bottom of stroke is known as the "fluid stroke" and is a measure of the amount of fluid lifted by the pump 14 on each stroke.

Because there are no sensors to measure conditions at the downhole pump 14, which may be located thousands of feet underground, surface measurements of the position and load for the rod string 12 at the pump jack 112 are used with numerical methods to calculate the position of the pump plunger 20 and the load acting on the plunger 20. These surface measurements are typically made at the top of the polished rod 15, which is a portion of the rod string 12 passing through a stuffing box 13 at the wellhead. A pump controller 150 is used for monitoring and controlling the pump system 10.

To efficiently control the reciprocating rod lift unit 100 and avoid costly maintenance, the rod pump controller 150 can gather system data and adjust operating parameters of the unit 100 accordingly. Typically, the rod pump controller 150 gathers system data such as load and rod string displacement by measuring these properties at the surface.

Current pumping units, such as the pump jack 112, are counterbalanced to reduce the energy consumption. The counterbalance subsystem uses weights 134 attached at predetermined points along crank arms 126 to offset a portion of the rod load in the well. The position of these weights 134 is normally calculated as a part of the initial setup and is based upon numerous factors including, but not limited to, the physical characteristics (length, weight, etc.) of the rod string 12, the fluid load, the size of the pumping unit 112, the type of gearbox 132, the type of motor 130, etc. The calculations involved in setting up the weight's position have been known for many years by those skilled in the art of conventional pumping units.

During the course of normal pumping operations, however, the rod loads may change. This results in a condition known as "out-of-balance," and it is desirable to correct this condition. Otherwise, the energy usage increases, and the operation of the reciprocating rod lift unit 100 is not optimal, which can reduce the operating life of some of the components.

Figure 10A:
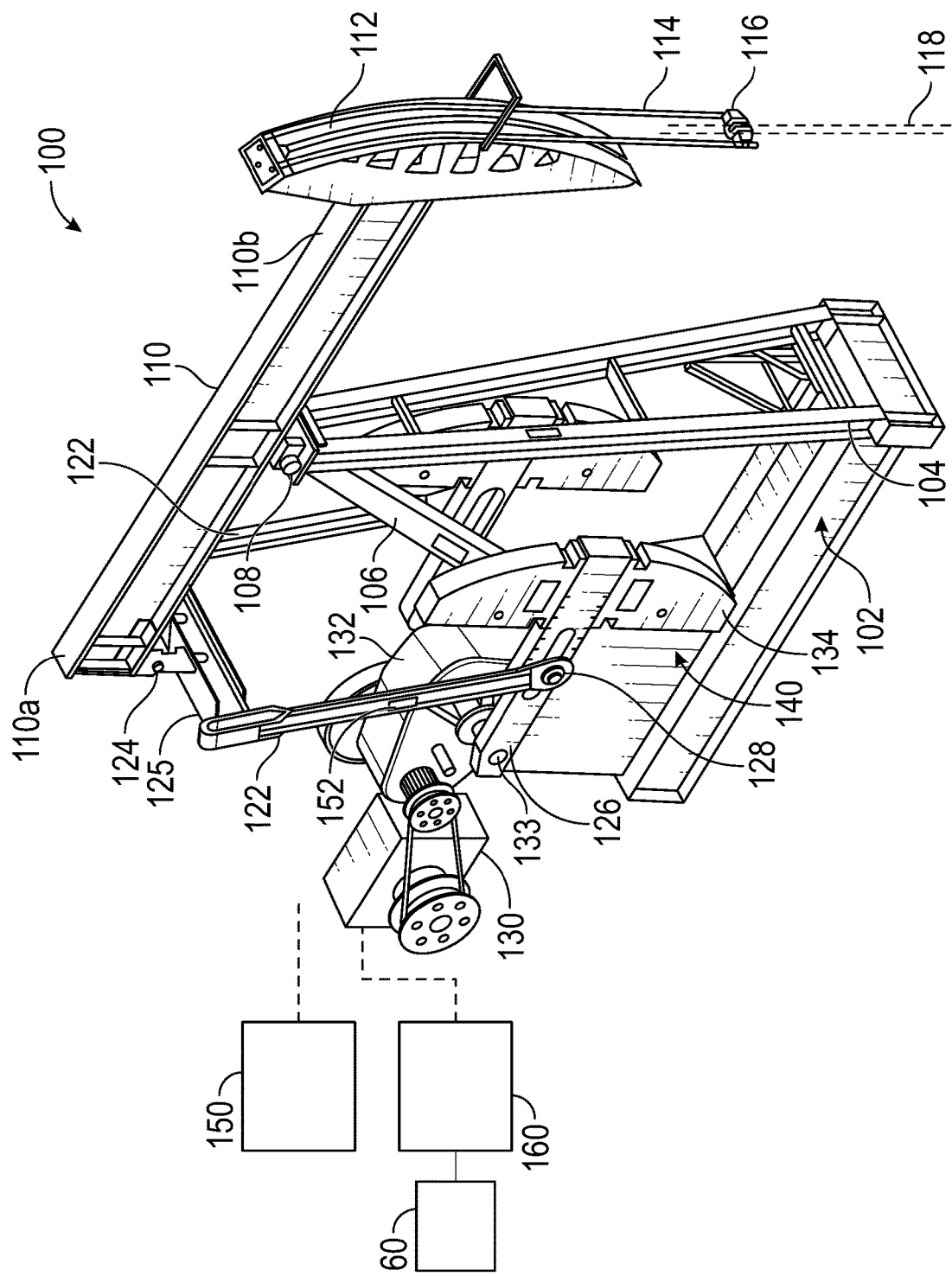
FIG. 10A illustrates a perspective view of a pumping unit having a counterweight balancing assembly according to the present disclosure.

Referring now to FIG. 10A, the reciprocating rod lift unit 100 according to the present disclosure is shown in addition detail including a frame 102, a walking beam 110 disposed on the frame 102, a crank assembly 120 connected to the walking beam 110, and an actuator 130 connected to the crank assembly 120. A polished rod 118 for a reciprocating rod system connects to a head 112 of the walking beam 110 using wireline 114 and a polished rod hanger 116.

The frame 102 is installed on a pumping unit base and may include one or more front posts 104 and one or more back post 106 joined together forming an A-frame to support the walking beam 110, which is pivotably supported by a bearing assembly 108.

The crank assembly 120 includes pitman arms 122 coupled to one end 110a of the walking beam 110 by a tail or equalizer bearing assembly 124. As shown, the unit 100 may have two pitman arms 122 joined by an equalizer beam 125, which is connected to the walking beam 110 by the bearing assembly 124. Each pitman arm 122 is pivotably connected to a crank arm 126 by a crank pin assembly 128, also called a wrist pin.

The actuator 130 primarily includes an electric motor that rotates the crank arms 126. Typically, a gearbox 132 is connected to the motor 130 and reduces the motor's rotation to a crankshaft 133 connected to the crank arms 126. For counterbalance as discussed herein, one or more counterweight blocks 134 may be attached to the crank arms 126.

As the actuator 130 rotates the crank assembly 120, the walking beam 110 seesaws on the frame's pivot 108 so the polished rod 118 reciprocates the rod system and downhole pump in the well. During operation, for example, the motor 130 and gearbox 132 rotates the crank arms 126, which causes the end 110a of the walking beam 110 to move up and down through the pitman arms 122. Up and down movement of the end 110a causes the walking beam 110 to pivot about the bearing assembly 108 resulting in downstroke and upstroke of the horse head 112.

During an upstroke, the motor 130 and gearbox 132 aided by the counterbalance weights 134 overcomes the weight and load on the horse head 112 and pulls the polished rod string 118 up from the wellbore, which reciprocates the rod string and downhole pump in the well to lift fluid. During a downstroke, the motor 130 aided by the weight and load on the horsehead 112 rotates the crank arms 126 to raise the counterbalance weights 134.

The counterbalance weight 134 is selected based on the weight and load of the reciprocating rod system (i.e., the force required to lift the reciprocating rod and fluid above the downhole pump in the wellbore). In one embodiment, the counterbalance weight 134 may be selected so that one or more components of the pumping unit 100 have substantially symmetrical acceleration and/or velocity during upstrokes and downstrokes. The component may be any moving part of the pumping unit 100, such as the pitman arm 122, the wrist pin assembly 128, the crank arm 126, the equalizer beam 125, the walking beam 110, the horse head 112, etc.

According to the present disclosure, the reciprocating rod lift unit 100 includes a management assembly 140 for balancing/adjusting the unit 100. As noted, the management assembly 140 can be part of or incorporated into the unit 100, can include local components and remote components, and can have other configurations as noted herein.

The management assembly 140 includes mechanically-adjustable components on the pumping unit 100 to adjust the position of the counterweights 134 on the crank arms 132 and/or change the wrist pin's location connecting the pitman arms 122 to the crank arms 126, which changes the balance of the unit 100. Details related to such mechanically-adjustable components can be found in co-pending U.S. application Ser. No. 15/345,288, filed 7 Nov. 2016 and entitled "Apparatus and Methods for Counterbalancing a Pumping Unit," which is incorporated herein by reference in its entirety.

As shown here, the management assembly 140 further includes a sensor interface 150 and a controller 160 for monitoring and controlling the reciprocating rod lift unit 100. In terms of the system 50 of FIGS. 1-2, the controller 160 can be a configured controller (70) of an artificial lift unit 100.

The sensor interface 150 has one or more sensors 152 that are attached to one or more moving components of the reciprocating rod lift unit 100. The sensors 152 measure one or more parameters related to an imbalance between the loads from the polished rod string 118 and the counterbalance weight 134. The one or more parameters may include at least one of velocity and acceleration of the moving component(s) and may include orientation of the counterbalance weight 134.

Even though a sensor 152 is shown in FIG. 10A attached at one position on the reciprocating rod lift unit 100, it will be appreciated that various types of sensors, such as sensors for orientation, velocity, acceleration, etc., may be attached at different positions on the unit 100. In general, the sensors 152 of the sensor interface 150 may be attached to any of a number of components on the unit 100, and the sensors 152 can be arranged on several components. For example, the sensors 152 may be attached to the pitman arm 122 to measure at least one of velocity and acceleration of the pitman arm 122 and may measure the orientation the counterbalance weight 134. The sensors 152 may be attached to the pitman arm 122 near the wrist pin assembly 128 so the controller 160 may measure velocity and/or acceleration of the counterbalance weight 134. Alternatively, the sensors 152 may be attached to the walking beam 110 or the horsehead 112 to measure the acceleration and/or velocity of the walking beam 110 or the horsehead 112. These and other configurations are possible.

During operations, the sensor interface 150 may send measurements to the controller 160 via wired, wireless, satellite, cellular, or other form of communication. For its part, the controller 160 include computer programs for analyzing the measurements from the sensor interface 150 and providing various forms of output. In particular, the controller 160 may determine imbalance of the counterbalance weight 134 based on the measurements from the sensor interface 150 and may provide balancing solutions, such as providing adjustment to balance the reciprocating rod lift unit 100.

Figure 10B:
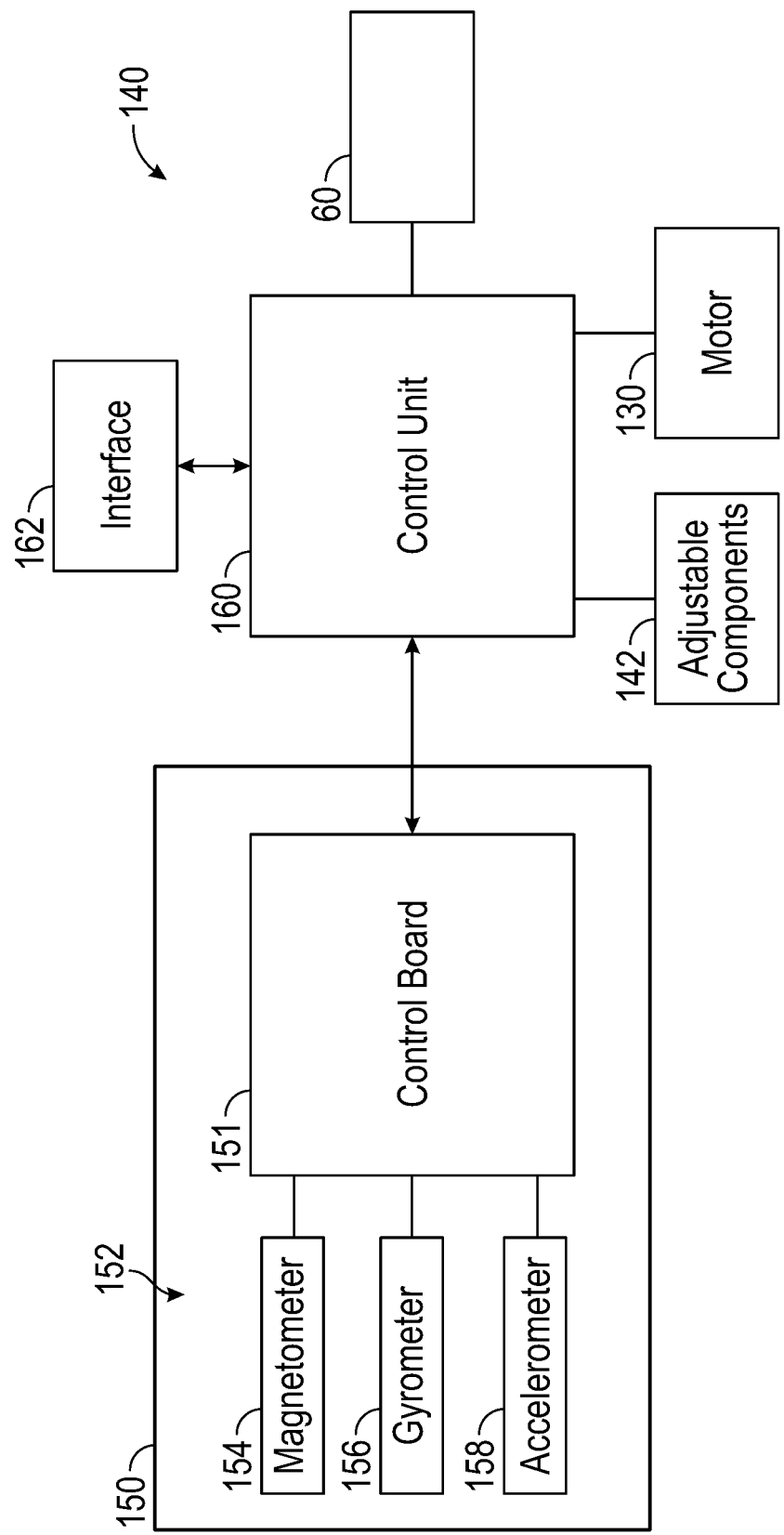
FIG. 10B illustrates a schematic diagram of a controller and a control device for the pumping unit of FIG. 10A.

With an understanding of the pumping unit 100, discussion turns to FIG. 10B, which schematically diagrams the elements of the monitoring assembly 140 according to one embodiment of the present disclosure. Again, the monitoring assembly 140 includes the sensor interface 150 and the controller 160.

The sensors 152 may include an orientation sensor 154 for measuring orientation, such as the orientation of the counterbalance weight (134). In one embodiment, the orientation sensor 154 may be a magnetometer, which is useful to describe the orientation of the element it is attached to in the earth's magnetic field. Furthermore, it could provide information on the placement or position of the counterbalance weight (134) in relationship to the element to which the sensor 154 is attached.

The sensors 152 may include a velocity sensor 156, which may be a gyrometer, such as a 3-axis gyrometer, although the velocity sensor 156 may be any suitable sensor for measuring velocity. The sensors 152 may include an acceleration sensor 158, which may be an accelerometer, such as a 3-axis accelerometer, although the acceleration sensor 158 may be any sensors suitable for measuring acceleration.

Even though both the velocity sensor 156 and the acceleration sensor 158 are shown in FIG. 10B, the sensor interface 150 may include only one of the velocity sensor 156 and the acceleration sensor 158, and it may also be configured to only sense the velocity or acceleration in one axis.

The sensor interface 150 may further include a control board 151 connected to the sensors 152. The control board 151 may include input/output ports to connect with the sensors 152. The control board 151 may establish a wired or a wireless communication with the controller 160.

The sensor interface 150 can be permanently mounted on the reciprocating rod lift unit 100 or can be a portable assembly to be installed and removed as necessary on a given unit. In one embodiment, the sensor interface 150 may include a hermetic housing that encloses the sensors 152 and the control board 151 therein. The sensor interface 150 may further include structures to permit secure attachment of the sensor interface 150 to a moving component of the pumping unit 100.

Just as the sensor interface 150 can be permanent or portable, the controller 160 may also be permanent or portable. For example, the controller 160 may be a computer or a mobile device, such as a smart phone or a tablet. The controller 160 may be incorporated into the overall control system of the reciprocating rod lift unit (100) as a permanent element, or the controller 160 may be a portable or remote component that interfaces with the reciprocating rod lift unit (100). The controller 160 may include one or more interfaces 162, such as user interface, a display, communication equipment, etc., and may include computer programs or an application for analyzing measurements from the sensor interface 150, detecting a balance condition, such as any imbalance, in the reciprocating rod lift unit (100), and/or providing a solution to balance/adjust the unit (100).

In providing a solution to balance/adjust the reciprocating rod lift unit (100), the controller 160 can provide adjustment(s) for the mechanically-adjustable components 142 of the assembly 140. For example, the controller 160 may include a program for displaying a graphical representation of the motion of the pumping unit (100) and may indicate an adjustment of the counterbalance weight (134) to achieve balance. In most cases, the adjustment to the counterbalance weight (134) may involve moving the weight on the crank arm (126) to a new position, but may involve adding or removing weight. In most cases, these adjustments must be done manually by technicians. In the event the pumping unit (100) has the capability, the adjustment to the counterbalance weight (134) or other counterbalance parameters can be done automatically using movable weights or the like. In providing a solution to balance/adjust the reciprocating rod lift unit (100), the controller 160 can provide adjustment(s) to the motor 130 of the pumping unit (100). Details of these solutions are disclosed, for example, with reference to FIGS. 4-11 in copending U.S. application Ser. No. 15/643,769, filed 7 Jul. 2017, and incorporated herein by reference in its entirety.

Figure 11A:
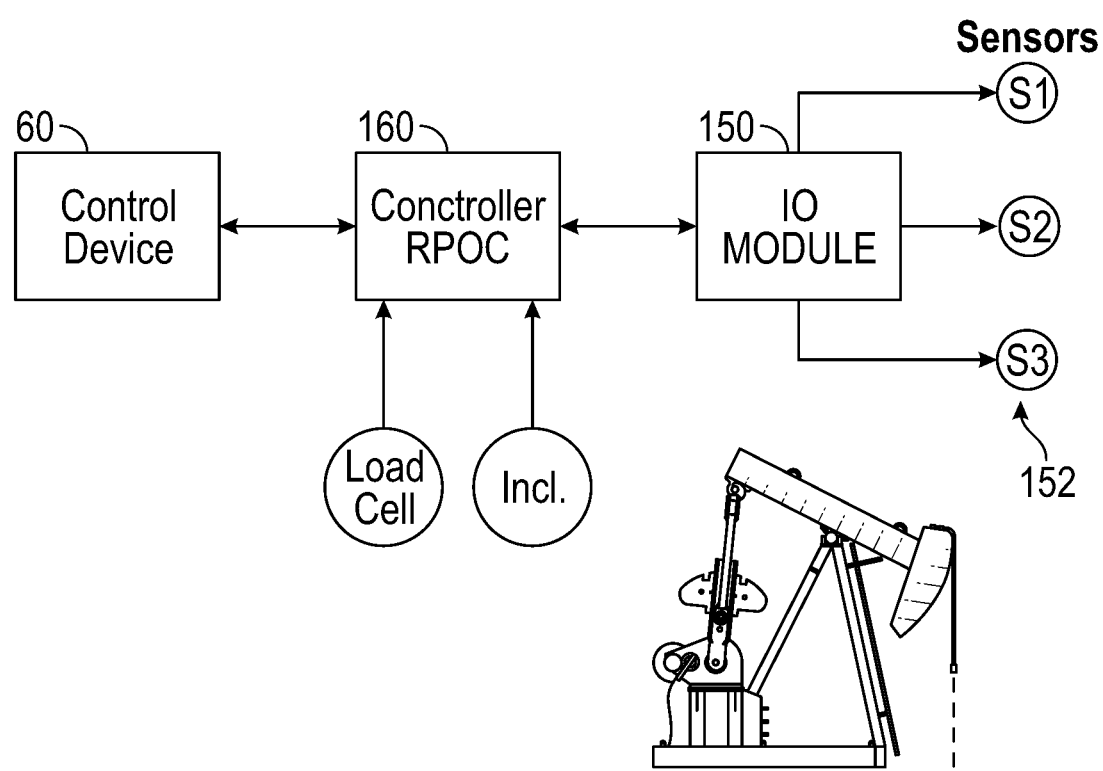
FIG. 11A illustrates integration of a control device with a reciprocating pump system having a configured controller.

As noted above, an artificial lift unit, such as the reciprocating rod pump unit 100, may or may not have a preconfigured controller, as in the controller 160. For example, FIG. 11A illustrates integration of a control device 60 with a reciprocating rod lift unit 100 having a compatible, preconfigured controller 160. Here, the controller 160 is a rod pump optimized controller. An example of such a controller includes the WELLPILOT® Controller for Rod Pump Optimization available from Weatherford International. (WELLPILOT is a registered trademark of Weatherford Technology Holdings, LLC.) The controller 160 connects via an input/output module of the sensor interface 150 to various sensors 152 of the unit 100. The load cell and inclinometer communicate with the controller 160. The control device 60 communicates directly with the controller 160, which is preconfigured for the integration.

Figure 11B:
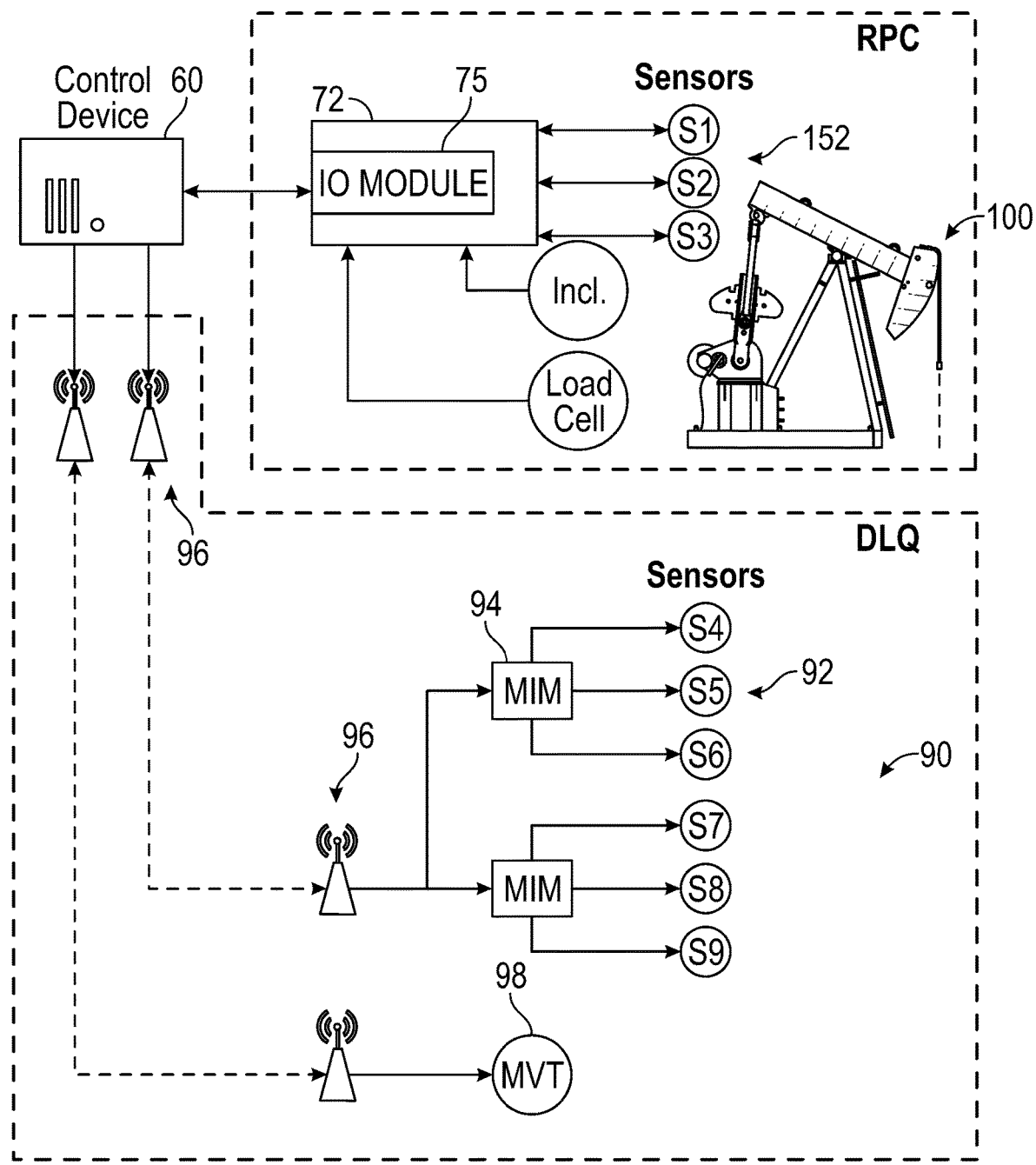
FIG. 11B illustrates integration of a control device with a reciprocating rod lift system having an existing controller.

FIG. 11B illustrates integration of a control device 60 with a reciprocating rod lift unit 100 lacking a compatible, preconfigured controller. Instead, the unit 100 includes an existing controller 72, which is a rod pump controller. An example of such a controller includes the WELLPILOT® As noted herein, the unit 100 includes various sensors 152, inclinometer, load cell, and the like. These communicate with an input/output module 75 of the unit controller 72, which commutates with the control device 60. For delifiquification, the unit 100 includes a delifiquification (DLQ) system 90. An example of such a system includes the WELLPILOT® Deliquification System. The system 90 includes sensors 92 communicating wirelessly with the control device 60. Interfaces (MIM) 94 connect the sensors 94 to wireless communications 96. Multivariable transmitter communications interface module (MVT) 98 for other units (100) can communicates with wireless communications 96. Although not shown, a gas lift controller can be attached to MIM 94 and MVT 98 and then to the communications. In turn, the wireless communications 96 of the DLQ system 90 communicates with the control device 60.

Jet Pump Unit

Figure 12A:
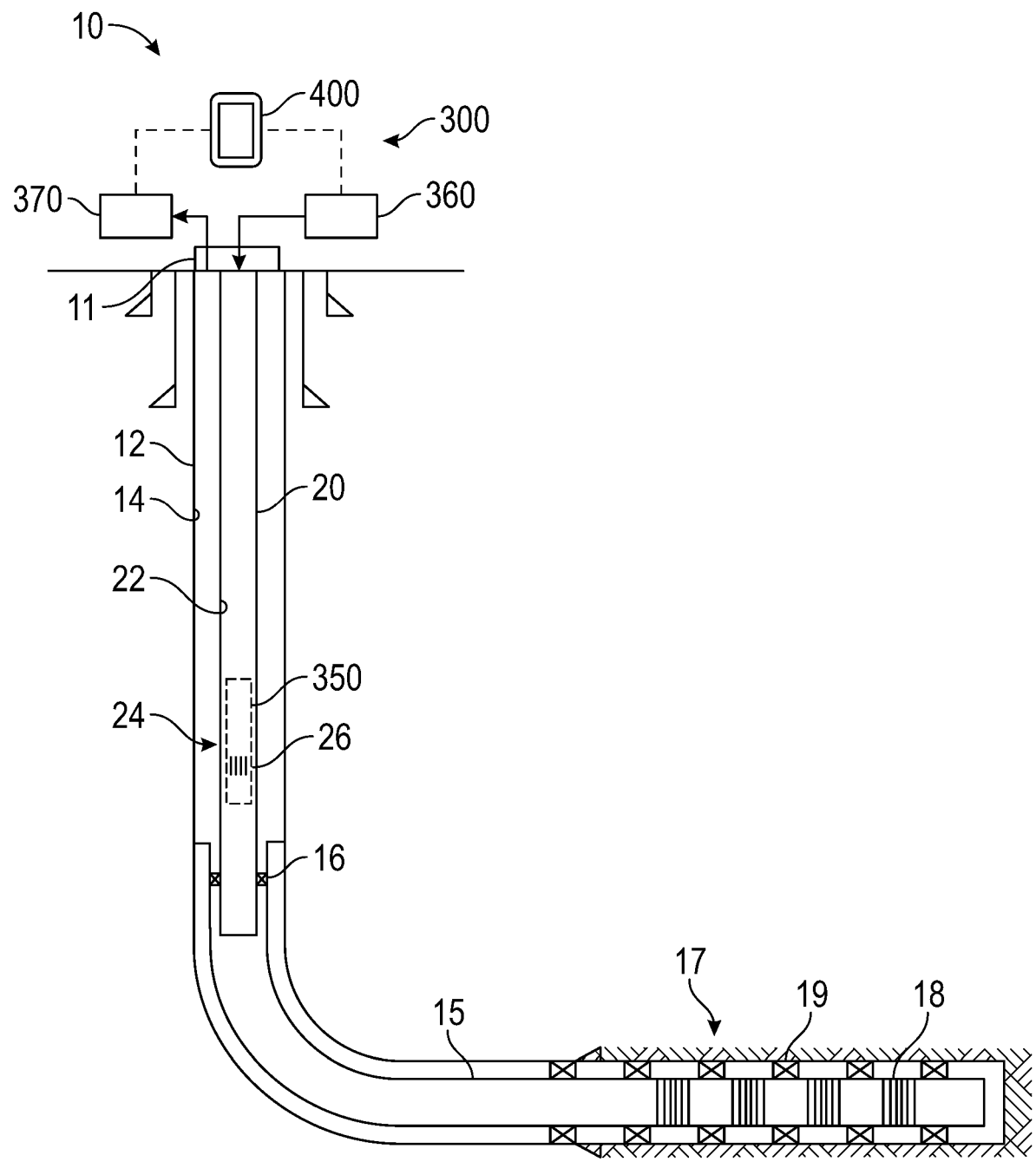
FIG. 12A illustrates a completion configured for artificial lift using a hydraulic jet pump system according to the present disclosure.

In addition to the reciprocating rod lift unit disclosed above, the control system 50 of the present disclosure can be used with other artificial lift units, such as gas lift units, gas injection units, etc. For example, FIG. 12A illustrates a completion 10 having another form of artificial lift unit 300 according to the present disclosure. The completion 10 includes casing 12 extending into a well to one or more production zones 17 downhole in a formation. As will be appreciated, the casing 12 typically includes a liner 15 having perforations, screens 18, isolation packers 19, inflow control devices, sliding sleeves, or the like at the production zones 17 for entry of formation fluids into the annulus 14 for eventual production at the surface.

Tubing 20 extends from the surface into the well and defines a throughbore 22 communicating with a bottom hole assembly 24. As schematically shown here, the bottom hole assembly 24 includes a packer 16 that seals off the annulus 14 in the casing 12/liner 15, as the case may be. The bottom hole assembly 24 also includes production ports 26 that communicate the throughbore 22 with the annulus 14.

As is known, a typical well may start its life with a high production rate produced by the natural flow of produced fluids from the well. As the formation is depleted, however, the production rate falls so that artificial lift is needed. Therefore, the completion 10 here is configured with a hydraulic jet pump unit 300 suited for artificial lift of the production fluid from the well. The lift equipment for the unit 300 includes a downhole jet pump 350 installed in the bottom hole assembly 24 and includes a surface power fluid unit 360. A conditioning unit 370 at surface can condition received fluid and can separate oil from gas and water. Finally, the lift unit 300 includes a jet pump controller 400, which can be used for several wells or can serve one well on an individual basis.

Figure 12B:
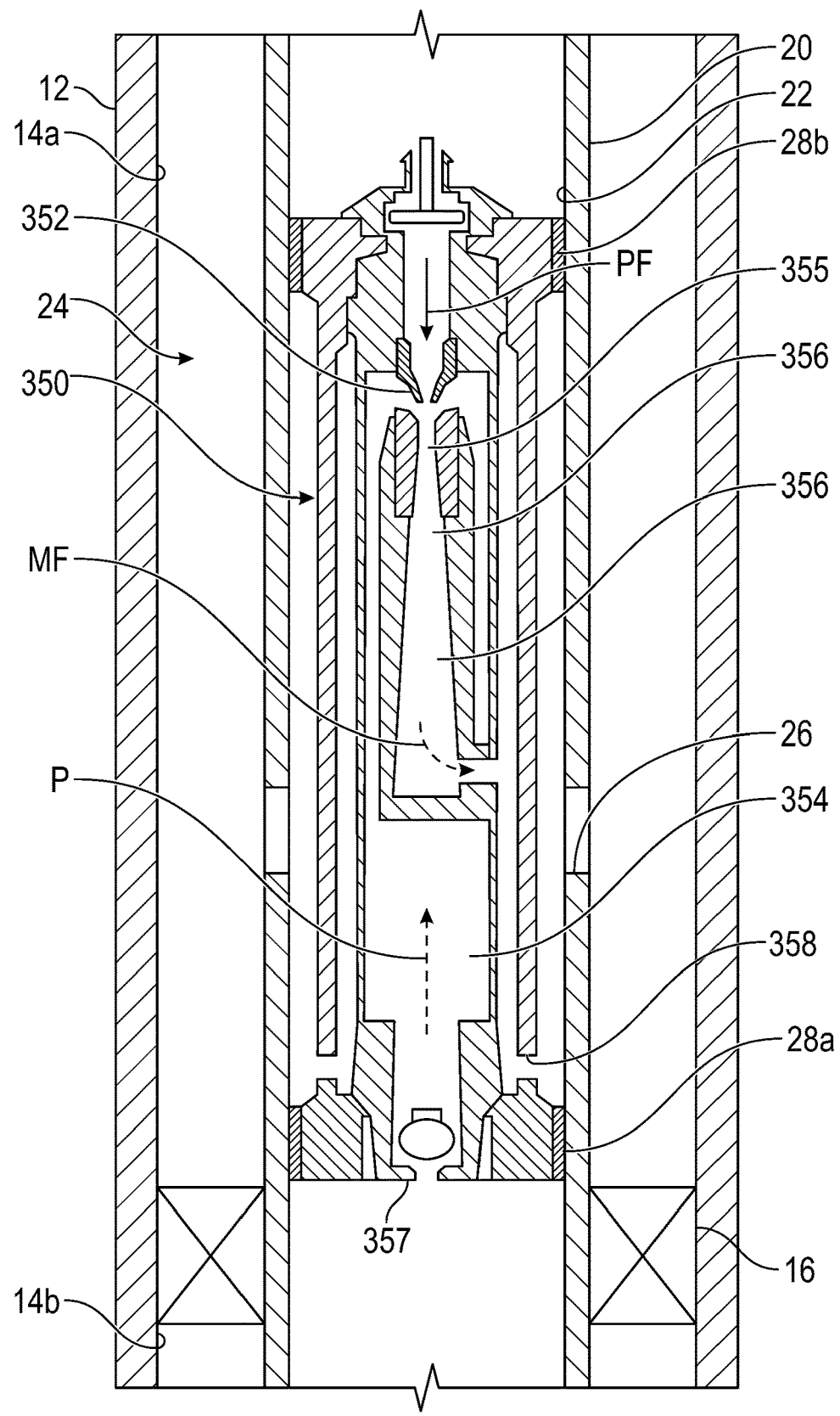
FIG. 12B illustrates the bottom hole assembly having a downhole jet pump.

With a general understanding of the completion 10 and the hydraulic jet pump unit 300, FIG. 12B illustrates portion of the completion's bottom hole assembly 24 having an example of a downhole jet pump 350 according to the present disclosure in more detail. Again, as shown, the completion 10 includes the casing 12 (or liner 15) for the well. The bottom hole packer 16 seals the annulus 14 of the casing 12 (or liner 15) with the tubing 20 disposed in the casing 12. Also, the tubing 20 includes the throughbore 22 having one or more production ports 26 communicating with the upper annulus 14a. As is common, the bottom hole assembly 24 on the tubing 20 can include a plurality of interconnected housings, components, tubulars, and the like connected together, which are not necessarily depicted here for simplicity.

As noted previously, the production equipment is configured for hydraulic lift using the downhole jet pump 350. The downhole jet pump 350 has been run into position into the bottom hole assembly 24. For example, the assembly 24 can include one or more internal elements (e.g., seals or seats) 28a-b disposed relative to the one or more ports 26. These elements 28a-b can be bore seals in the form of polished bores for engaging seals of the downhole jet pump 350 inserted therein. In some implementations, the elements 28a-b may include seal rings, nipples, latch profiles, seats, and the like for engaging the downhole jet pump 350 removably inserted in the equipment's throughbore 32. As one example, a profile, such as an X-lock profile, may be provided in the throughbore 22 to lock the disclosed jet pump 350 in place.

The lift equipment can also include a standing valve 357 disposed at the inlet of the downhole jet pump 350. The standing valve 357 can be part of (or installed on) the downhole jet pump 350 and can be run in with it. Alternatively, the standing valve 357 may be an independent component run separately.

The downhole jet pump 350 includes a nozzle 352, and inlet 354, a throat 355, a diffuser 356, and an outlet 358. As noted herein, components of the downhole jet pump 350 are preferably configured to suit production requirements and downhole conditions. For example, different configurations and materials can be used for the nozzle 352, the throat 355, and the diffuser 356.

During a hydraulic lift operation, the power-fluid unit (360), including power fluid storage, surface pump, prime mover, flow controls, and the like, pressurizes a power fluid PF and injects the pressurized power fluid PF into the throughbore 22 of the tubing 20. The power fluid PF travels down the tubing 20. At the jet pump 350, the power fluid PF enters the inlet nozzle 352. Meanwhile, production P isolated downhole in the lower annulus 14b can flow up through the throughbore 22 past the standing valve 355 and into the inlet 354 of the downhole jet pump 350. For its part, the standing valve 355 prevents escape of production fluid P from the hydraulic jet pump 350 downhole in the absence of sufficient fluid level.

The nozzle 352 reduces the fluid pressure of the power fluid PF using the Venturi effect. This draws production fluid P into the pump's throat 355 where the power fluid FP and production fluid P combine. The mixed fluid MF then transfers to the pump diffuser 356, where pressure is increased at the pumps outlet 358 so the mixed fluid MF can exit ports 26 and can be raised to the surface in the annulus 14a.

In the previous arrangement, the jet pump 350 operates with the power fluid PF communicated from surface down the throughbore 22 so that the mixed fluid MF can travel up the annulus 14a. A reverse operation can also be used. In particular, the jet pump 350 can be installed in the throughbore 22, and power fluid PF can be communicated from surface down the annulus 14a where it can then enter the jet pump 350 through the port 26, 358. As before, production P rising up the throughbore 32 from downhole also enters the jet pump 350 and the two fluids mix therein. Finally, the mixed fluid MF then travels uphole to surface through the tubing's throughbore 22.

FIG. 12B illustrates some of the component of the jet pump unit 300 in additional detail. The power-fluid unit 360 on a skid at the surface can serve one well on an individual basis (as shown here) or can be used for several wells. The power-fluid unit 360 has a prime mover 368 and a surface pump 362 and is used for injecting power fluid into a wellhead 11 to operate the downhole jet pump 350 of the bottom hole assembly 24 disposed in the bore 22 of the tubing 20.

The power-fluid unit 360 can pressurize produced reservoir fluid to operate the downhole jet pump 350. For example, the surface pump 362 can include a multiplex pump ranging from 60 to 625 HP, and the prime mover 368 can include an electric motor or a multi-cylinder drive controlled by a variable speed drive 369.

The conditioning unit 370 on the skid at surface includes a vessel 372 to receive production fluid and exhausted power fluid from the well. The conditioning unit 370 cleans and conditions the received fluid and can separate oil from gas and water. Finally, the lift unit 300 includes the jet pump controller 400, which can serve one well on an individual basis (as shown) or can be used for several wells.

Figure 12C:
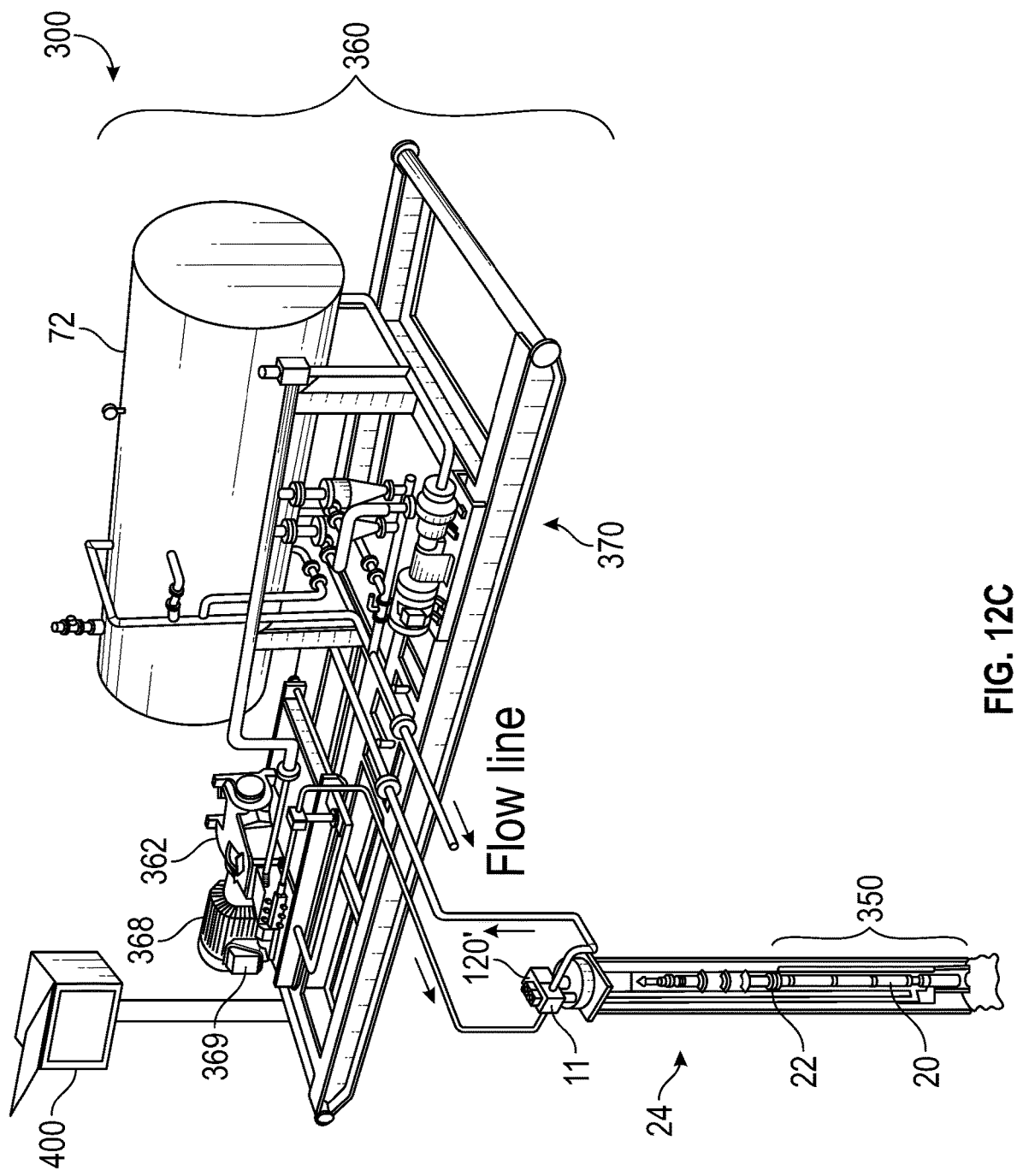
FIG. 12C illustrates some of the surface equipment of the jet pump system relative to the downhole jet pump.
Figure 13:
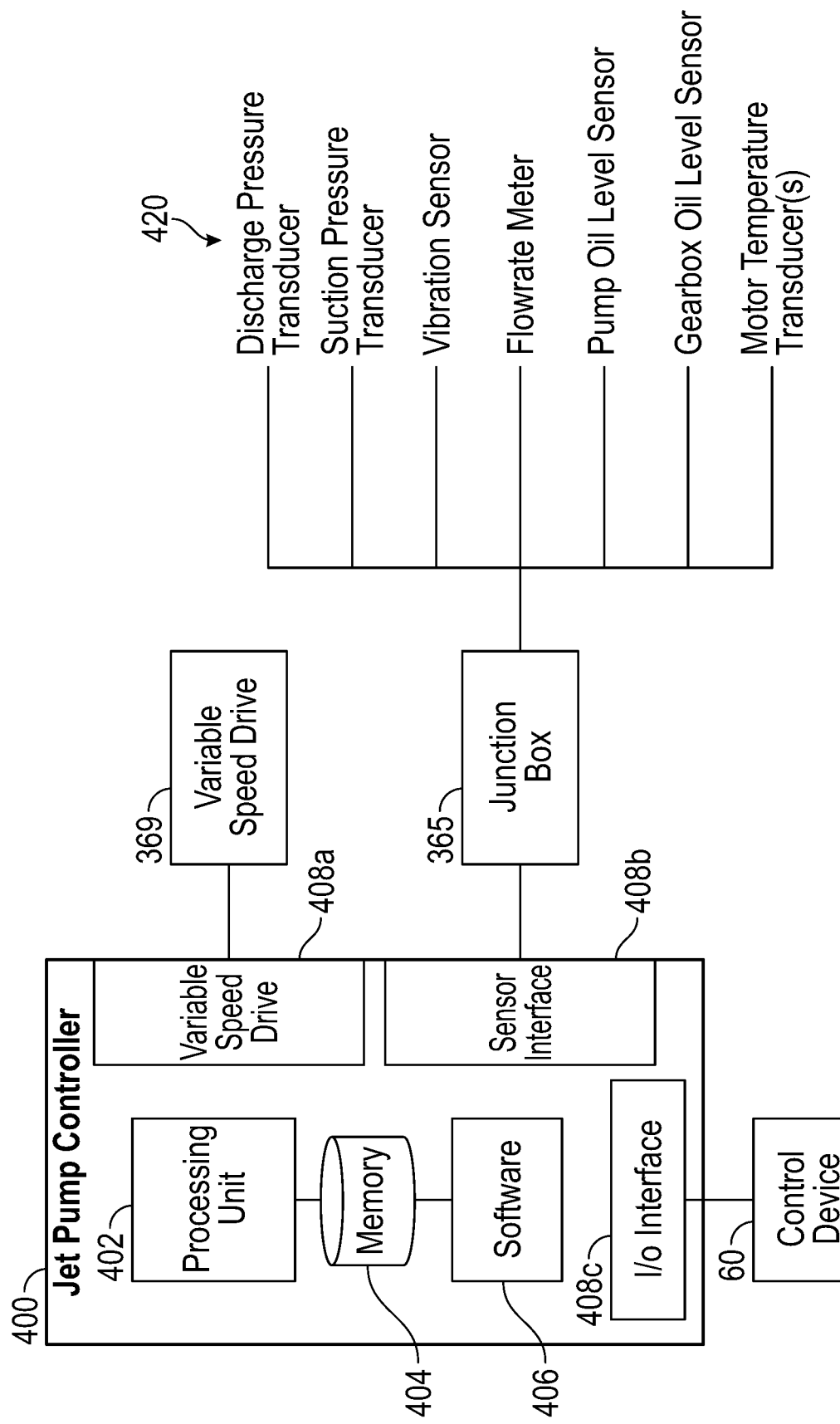
FIG. 13 illustrates a schematic of a jet pump controller of the present disclosure.

FIG. 12C illustrates a schematic of a jet pump controller 400 of the present disclosure. The controller 400 includes a processing unit 402, memory 404, software 406, a drive interface 408a, a sensor interface 408b, and an input/output interface 408c. The processing unit 400 and memory 404 can use any acceptable equipment suited for use in the field at a wellsite having artificial lift equipment according to the present disclosure. For example, the processing unit 402 can include a suitable processor, digital electronic circuitry, computer hardware, computer firmware, computer software, and any combination thereof. The memory 404 can include any suitable storage device for computer program instructions and data, such as EPROM, EEPROM, flash memory device, magnetic disks, magneto-optical disks, ASICs (application-specific integrated circuits), etc.

Software 406 operating on the controller 400 monitors inputs from a number of sensors 420, performs analysis, and controls the prime mover with the variable speed drive 368 used for driving the hydraulic jet pump unit (300). The software 406 includes algorithms in the modelling functions for calculating parameters for the hydraulic jet pump unit (300). These algorithms can be similar to those available from Jet Pump Evaluation and Modeling Software (JEMS) software available from Weatherford International. The controller 400 further connects with or is integrated with a control device 60 according to the present disclosure, which achieves the purposes disclosed herein.

The drive interface 408a connects to the variable speed drive 369 for the prime mover (i.e., motor) used for operating the surface pump of the unit (300). The drive interface 408a can also connect to a controllable flow device 367 if necessary to control the discharge pressure in the discharge line of the surface unit (360).

The sensor interface 408b connects through a junction box 365 to the various sensors 420, such as pressure transducers, vibration sensors, flowrate meters, level sensors, and temperature transducers. As discussed in more detail below, these sensors 420 are configured and arranged on the hydraulic jet pump unit (300) according to the type of surface pump used.

According to one aspect and a shown in FIG. 12C, the unit 300 can further include a cavitation sensor 420', such as a microphone, an accelerometer, a vibrational sensor, or a gyroscope, associated with the wellhead 11 and/or the downhole jet pump 350. This cavitation sensor 420' can be configured to detect vibrations or other indications of cavitation, as taught in co-pending U.S. application Ser. No. 15/252,412, filed 31 Aug. 2016 and incorporated herein by reference.

The input/output interface 408c can connect to a display 410, an input device 412, and a communication interface 414. The display 410 on the controller 400 can be a touchscreen for the input device 412. The communication interface 414 can allow for download of inputs/upload of outputs through memory devices, wireless communications, etc.

At the controller 400, a field operator can manually input initial configuration data into the controller 400 through the display 410 and input device 412. Alternatively, the initial configuration data can be input via the communication interface 414, such as through a download from a storage device or from satellite or wireless communication. This initial configuration data typically includes configuration information and computational analysis, such as available in Weatherford's JEMS program. Several models have been constructed in the art based on theoretical and empirical analysis of jet pumps, and the computation of the controller 400 can be based on any suitable model.

After the initial configuration from the inputs, proper sizing of the nozzle and throat, and configuration of operating parameters for the power-fluid unit (360), the controller 400 uses sensor inputs and computations in real-time to predict inefficiencies (e.g., to predict the bottom hole pressure and to optimize the output of the surface power unit 360) so that the jet pump 350 continues to run efficiently over time, even as operating conditions of the unit 300 change. Analysis and solutions typically provide information, such as head pressures, bottom hole pressure, intake pressure, power fluid flow rate, produced fluid flow rate, hydraulic horsepower to be used, etc. Because knowledge of cavitation is important when operating the jet pump 350, the controller 400 also calculates and displays the cavitation limits of the unit (300) based on the real-time information.

In this way, the controller 400 in conjunction with the disclosed control device 60 can optimize the run life of the jet pump 350 by keeping the jet pump 350 from getting into cavitation. The controller 400 can also track trends in the decline of the well and predict when the jet pump 350 will go into cavitation. In general, therefore, the controller 40 can track trends and predicting a decline of the well at the wellsite of the at least one artificial lift unit that leads to deleterious operation of the at least one artificial lift unit. These and several other functions can be handled by the controller 400, as discussed below. Although not discussed in detail here, it will be appreciated that the controller 400 can also be configured to operate and control the conditioning of the power fluid by the conditioning unit 370.

The control system 50 having a control device 60 monitors and controls the hydraulic jet pump unit (300) using techniques disclosed, for example with reference to FIGS. 3 to 7 of copending U.S. application Ser. No. 16/363,592, filed 25 Mar. 2019, which is incorporated herein by reference in its entirety.

Figure 14:
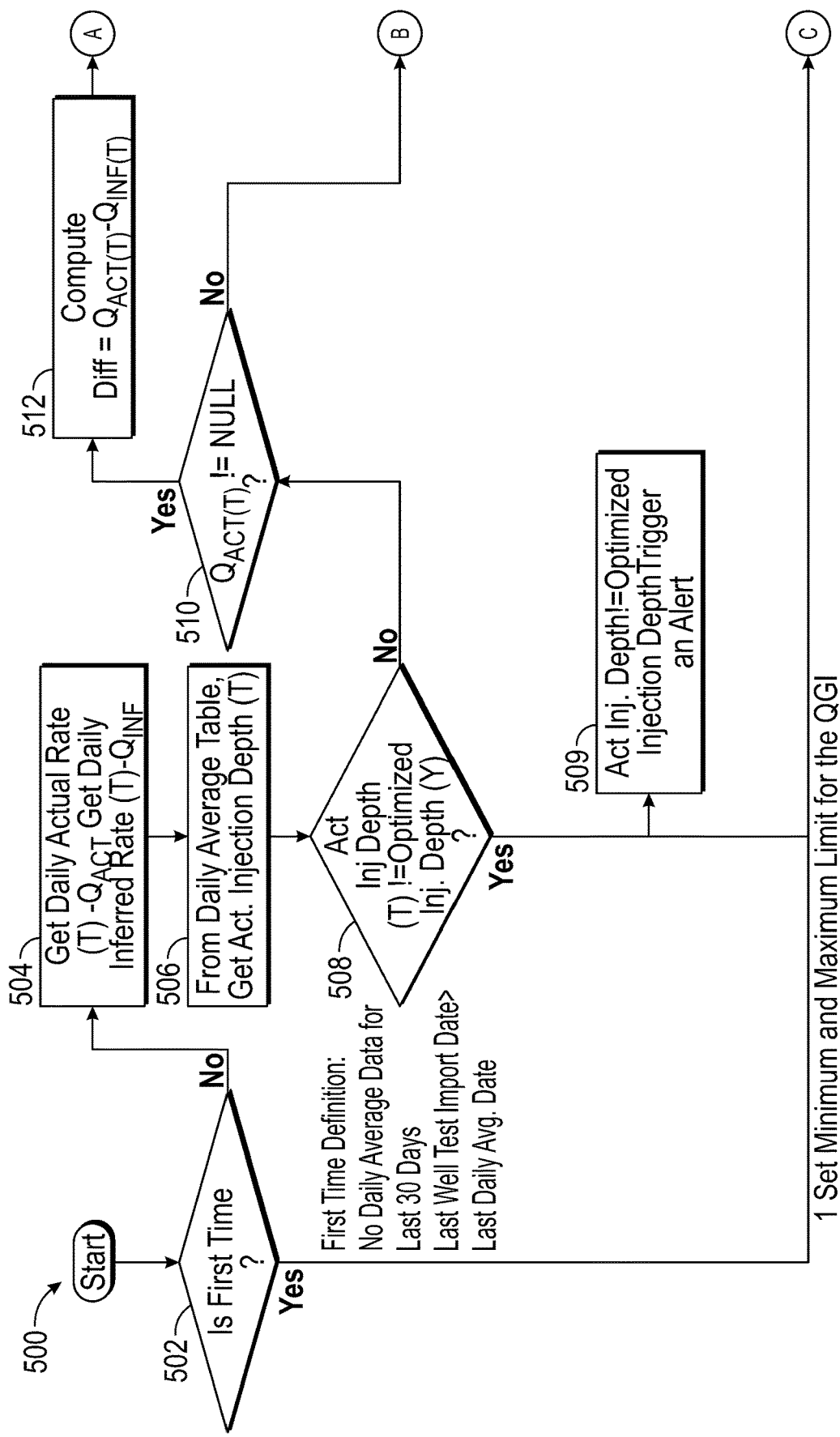
FIG. 14 illustrates a process of controlling a gas injection unit according to the present disclosure.
Figure 14:
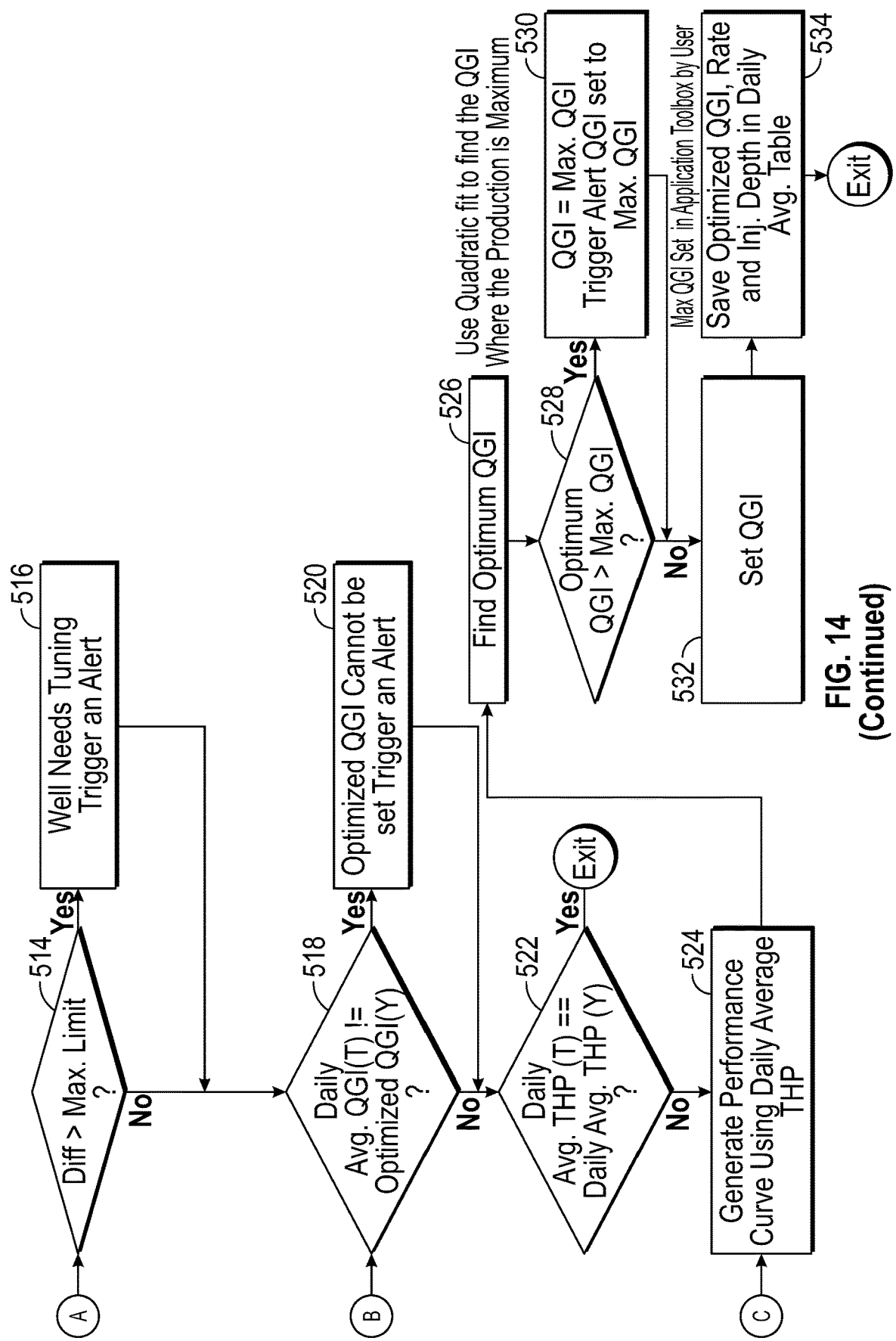

In addition to the examples disclosed above, the control system 50 of the present disclosure can be used with gas injection units. For example, FIG. 14 illustrates an automated control process (500) of the disclosed control system (50) in controlling the gas injection rate of a gas injection unit with automated control from a control device (60) of the present disclosure.

In the process (500), as long as the analysis is not the first time (502), actual and inferred injection rates (T-Today) can be obtained (504), along with the actual injection depth (T) (506). A decision (508) determines whether the actual injection depth (T) does not equal an optimized injection depth (Y-Yesterday). If so, the process (500) determines that the actual injection depth does not equal the optimized injection depth and triggers an alert (509). Further analysis (524) follows as discussed below. This further analysis is comparable to the initial analysis provided by the process (500), or when there are discrepancies in the injection rate.

If at the decision (508), the process (500) determines that the actual injection depth (T) does equal the optimized injection depth (Y), the process (500) moves to a decision of whether the actual injection rate (T) is not null (510). If the actual injection rate (T) is null (no at decision), then a decision (518) is made where the daily average gas injection rate QGI(T) is not equal to an optimized gas injection rate QGI(Y), which is discussed below.

If the actual injection rate (T) is not null (yes at decision), then the process (500) computes the difference between the actual injection rate (T) and the inferred injection rate (T) (512). If the difference is greater than a user configurable maximum (514), then the well needs tuning, and an alert is triggered (516). If the difference is not greater than the user configurable maximum, then a decision (518) is made where the daily average gas injection rate QGI)(T) is not equal to an optimized gas injection rate QGI(Y). If so, then the optimized gas injection rate cannot be set, and an alert is triggered (520). If the daily average gas injection rate QGI(T) is equal to an optimized gas injection rate QGI(Y), then a decision (522) is made whether the daily average tubing head pressure THP(T) is equal to the daily average tubing head pressure THP(Y). If so, the process (500) exists. If not, the process (500) generates a performance curve generating the daily average tubing head pressure THP (524) and finds an optimum gas injection rate QGI (526). For example, the process (500) can use a quadratic fit to find the gas injection rate QGI for which production is maximized.

A decision (528) is made in the process (500) where the optimum gas injection rate QGI is greater than a maximum gas injection rate allowable. If so, then the gas injection rate is set to the maximum gas injection rate QGI, and an alert is triggered. (530). The maximum gas injection rate QGI can be set be the user in the toolbox of the control application of the present disclosure.

Otherwise, if the optimum gas injection rate QGI is not greater an a maximum gas injection rate allowable, the gas injection rate for the gas injection unit is set (532), the optimized gas injection rate is saved along with the rate and inject depth in the daily average table stored for the gas lift unit (534).

Figure 15:
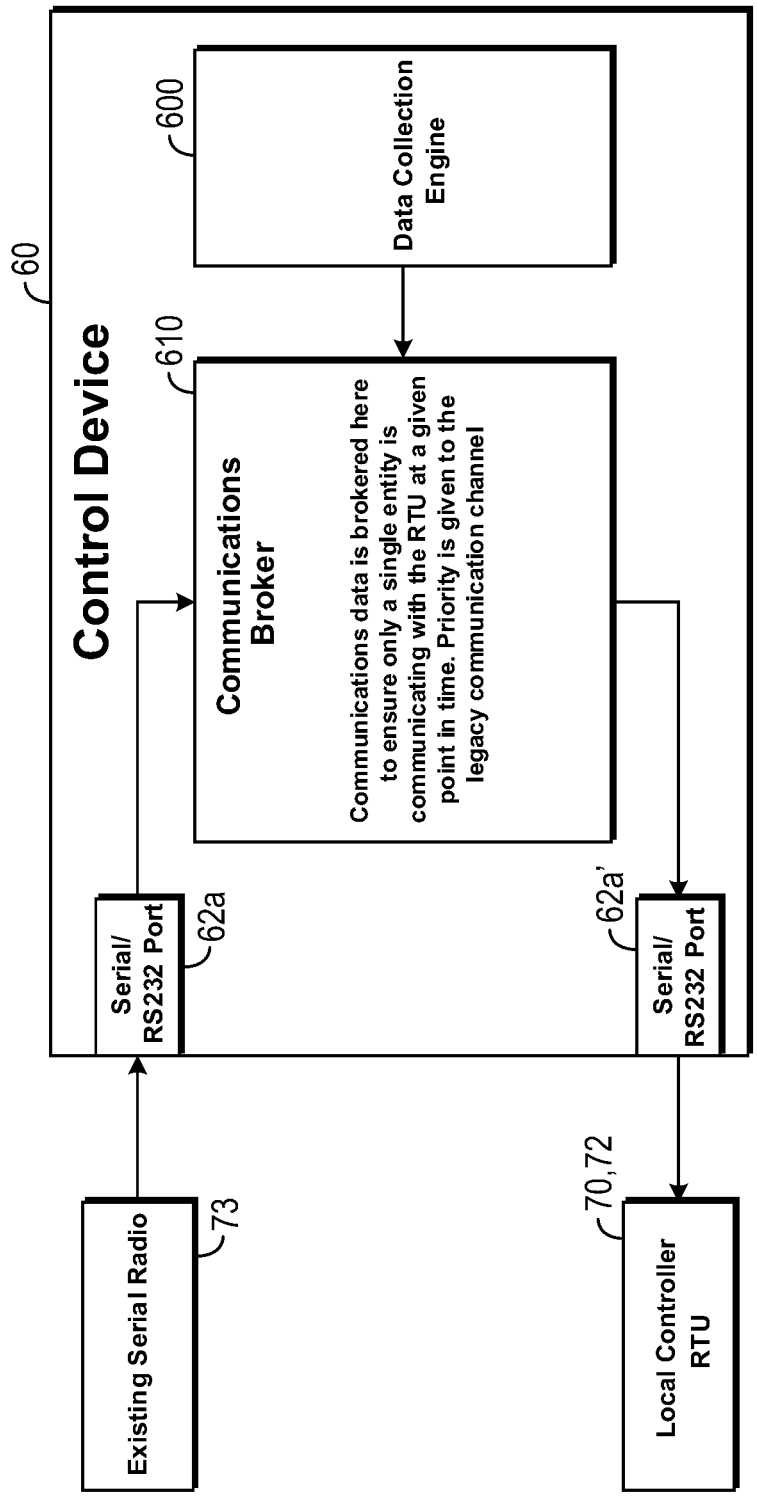
FIG. 15 illustrates a control device in a configuration to broker communications for the disclosed system.

FIG. 15 illustrates a control device 60 in a configuration to broker communications for the disclosed system. As discussed previously and shown again, the control device 60 has a first communication interface 62a with an installed or existing communication system 73. For example, the first communication interface 62a can be a serial/RS232 port connected to an installed or existing serial radio system 73 at the wellsite. The control device 60 also has a second communication interface 62a' with an installed or existing device 70, 72 at the wellsite. For example, the second communication interface 62a' can be a serial/RS232 port connected to an installed or existing local controller or remote terminal unit 70, 72 at the wellsite.

The control device 60 includes a Communications Broker 610 that interfaces between the existing communication system 73 and a data collection engine 600 of the control device 60. The data collection engine 600 collects data and communications from other data sources and communication systems, such as the other network configurations disclosed herein. The data collection engine 600 includes those elements discussed above, such as the SCADA module 230, polling 232, and the like with respect to FIG. 3. These other data sources and communication systems may be capable of faster data rates and bandwidth than the existing/installed communication system 73. The communications broker 610 brokers communication data to the local controller/remote terminal unit 70, 72 to ensure only a single entity is communicating with the local controller/remote terminal unit 70, 72 at a given point in time. Priority is given to the existing/installed communication channel of the system 73 and interface 62a.

As disclosed herein, one of benefits of the control device 60 is its ability to retrofit existing wellsites that have legacy, existing, or installed hardware without requiring a substantial change to their current communications infrastructure. To accomplish this, the communications broker 610 enables the control device 60 to act as a broker or proxy device for existing communications. The broker 610 manages communications from multiple sources by internally switching and prioritizing requests that originate from the legacy polling infrastructure. This switching and prioritization require analysis of the data that is coming from a requestor. Knowing the protocols used by the legacy system and the internal polling system, the broker 610 performs protocol level packet analysis to route the traffic to the correct destination. This routing occurs when a response is received from the existing RTU/controller 70, 72; a request is received from the existing polling/serial communications channel 73, 62*a*, or the control device's internal polling infrastructure 600 requests data from the RTU/controller 70, 72. As will be appreciated, logical requests to the RTU/controller 70, 72 can span multiple data packets.

The brokering of this traffic allows the original polling infrastructure, which is typically slower, to poll the RTU/Controller 70, 72 at the same rate without interruption. At the same time, the data collection engine 600 of the control device 60 can poll the RTU/Controller 70, 72 at a high rate of speed during the times that the legacy polling infrastructure is not communicating with the RTU/Controller 70, 72.

Figure 16:
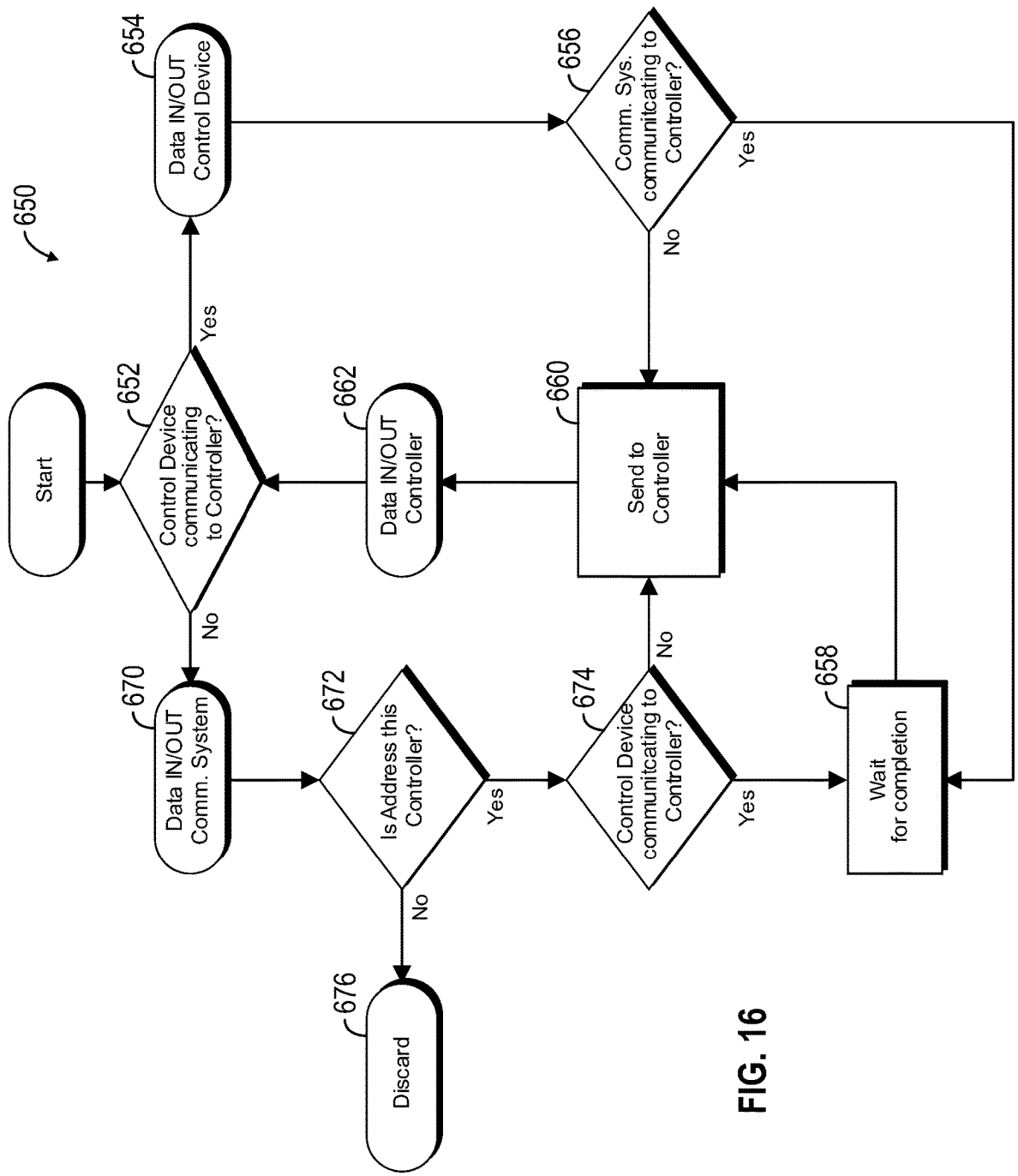
FIG. 16 shows a brokering process handled by the communications broker of the control device of FIG. 15.

FIG. 16 shows a brokering process 650 handled by the communications broker 610 of the control device 60 of FIG. 15. At repetitive processing starts during operations, the broker 610 monitors whether the control device 60 is communicating to the local controller 70, 72 (Decision 652). If the control device 60 is communicating to the local controller 70 (Yes-Decision 652), then the broker 610 handles the input/output data of the control device 60 (Block 654). As the broker 610 handles the data, the broker 610 monitors whether the existing/installed communication system 73 is communicating to the controller 70 (Decision 656) If not (No-Decision 656), then the broker 610 can send the control device's communication to the controller 70 (Block 660) and handles the input/output data of the control device 60 to the controller 70 (Block 662).

As the broker 610 monitors (Decision 656), it may determine that the existing/installed communication system 73 is communicating to the controller 70 (Yes-Decision 656). In this instance, the broker 610 waits for the communication to be completed (Block 658) before then handling the input/output data of the control device 60 to the controller 70 (Blocks 660, 662).

As the broker 610 monitors, it may determine that the control device 60 is not communicating to the local controller 70, 72 (No-Decision 652). At this point, the broker 610 handles the input/output data of the communication system 73 (Block 670). As the broker 610 handles the data, the broker 610 monitors whether the existing/installed communication system 73 is communicating to the controller 70 (Decision 672). If the data is for some other entity (No-Decision 672), then the broker 610 discards the data from its buffering, allowing other elements of the control device 60 to handle the routing and processing of that data. If the data is addressed to the controller 70 (Yes-Decision 672), then the broker 610 monitors whether the control device is communication with the controller 70 (Decision 674). If not, then the broker 60 sends the communication to the controller 70 (Block 660) and handles the input/output data to the controller 70 (Block 662).

If the control device 60 is communicating to the controller 70 (Yes-Decision 674), the broker 610 waits for the communication to be completed (Block 658) before then handling the input/output data to the controller 70 (Blocks 660, 662).

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

The invention claimed is:

1. A method of controlling a plurality of artificial lift units at a plurality of wellsites, the artificial lift units including jet pumps operated by surface power units, the artificial lift units having installed controllers, installed sensing equipment, and installed communication systems, the method comprising:

interfacing distributed processing equipment with the installed controllers and the installed communication systems at the plurality of the wellsites;

connecting the distributed processing equipment together in one or more networks;

obtaining, at the distributed processing equipment, operating parameters of each of the artificial lift units from the installed sensing equipment at the wellsites in real time;

analyzing, with modelling functions of the distributed processing equipment, trends of the operating parameters of at least the jet pumps of the artificial lift units by tracking declines in production of the jet pumps at the wellsites;

predicting, with automated machine learning of the distributed processing equipment, conditions of at least the jet pumps of the artificial lift units based on the analyzed trends by predicting deleterious operation of the jet pumps going into cavitation leading to damage of the jet pumps based on the tracked declines, the deleterious operation requiring a manual correction;

determining, with the distributed processing equipment, at least one temporary automated control configured to counteract the predicted conditions of at least the jet pumps of the artificial lift units by determining outputs of the surface power units of the jet pumps, the outputs being configured to mitigate the jet pumps going into cavitation as a remedial correction at least until the manual correction is performed; and regulating the output of each of the surface power units to adjust a fluid state configured to mitigate cavitation of at least the jet pumps by implementing the at least one temporary automated control with instructions communicated from the distributed processing equipment to the installed controllers of at least the jet pumps.

2. The method of claim 1, wherein interfacing the distributed processing equipment comprises installing a plurality of control devices in the one or more networks, each of the control devices having at least one first interface for network communications with the one or more networks and having at least one second interface for local communication with at least one of the installed communication systems.

3. The method of claim 2, the artificial lift units including two or more types of the artificial lift units each having a given type of the installed controllers, wherein interfacing the distributed processing equipment comprises: interfacing a given one of the control devices with one or more of the two or more types of the artificial lift units; or interfacing a given one of the control devices with a given type of the two or more types of the artificial lift units.

4. The method of claim 1, wherein obtaining, at the distributed processing equipment from the installed sensing equipment at the wellsites in real time, the operating parameters of each of the artificial lift units comprises communicating the operating parameters of each of the artificial lift units using a combination of the one or more networks and the installed communication systems.

5. The method of claim 1, further comprising brokering, with the distributed processing equipment, communications to and from the installed controllers between the processing equipment and the installed communication systems.

6. The method of claim 5, wherein brokering the communications comprises giving precedence to a first the communications for the installed communication systems over a second of the communications for the one or more networks.

7. The method of claim 1, wherein analyzing, with the modelling functions of the distributed processing equipment, the trends of the operating parameters of the artificial lift units comprises one of: analyzing with physics-based models based on information of the wellsites and the artificial lift units, analyzing with models created on location at the wellsites, and analyzing engineering models configured as a digital representation of the wellsites and artificial lift units.

8. The method of claim 1, wherein analyzing, with the modelling functions of the distributed processing equipment, the trends of the operating parameters of the artificial lift units comprises orchestrating batch jobs for data pipelines by using a workflow management engine.

9. The method of claim 1, wherein predicting, with the automated machine learning of the distributed processing equipment, the conditions of the artificial lift units based on the analyzed trends comprises predicting the conditions of at least one of: an equipment failure of at least one of the artificial lift units; a failure of the well at the wellsite of at least one of the artificial lift units; predicting an inefficiency of at least one of the artificial lift units; and predicting a decline of the well at the wellsite of at least one of the artificial lift units that leads to the deleterious operation of the at least one artificial lift unit.

10. A method of controlling a plurality of artificial lift units at a plurality of wellsites, the artificial lift units including reciprocating rod lift units, the artificial lift units having installed controllers, installed sensing equipment, and installed communication systems, the method comprising:
interfacing distributed processing equipment with the installed controllers and the installed communication systems at the plurality of the wellsites;
connecting the distributed processing equipment together in one or more networks;
obtaining, at the distributed processing equipment, operating parameters of each of the artificial lift units from the installed sensing equipment at the wellsites in real time;
analyzing, with modelling functions of the distributed processing equipment, trends of the operating parameters of at least the reciprocating rod lift units of the artificial lift units by monitoring balance of the reciprocating rod lift units of the artificial lift units;
predicting, with automated machine learning of the distributed processing equipment, conditions of at least the reciprocating rod lift units of the artificial lift units based on the analyzed trends by predicting deleterious operation of the reciprocating rod lift units in out-of-balance conditions leading to damage of the reciprocating rod lift units based on the monitored balance, the deleterious operation requiring a manual correction;
determining, with the distributed processing equipment, at least one temporary automated control configured to counteract the predicted conditions of at least the reciprocating rod lift units of the artificial lift units by determining adjustments to the reciprocating rod lift units to counteract the out-of-balance conditions as a remedial correction at least until the manual correction is performed; and
regulating output of an actuator of each of the reciprocating rod lift units to adjust a pumping speed configured to counter the out-of-balance conditions by implementing the at least one temporary automated control with instructions communicated from the distributed processing equipment to the installed controllers of at least the reciprocating rod lift units.

11. The method of claim 10, comprising implementing the at least one temporary automated control at the reciprocating rod lift units by implementing one of: automatically adjusting a motor of the actuator, and automatically adjusting movable counterwieights of the actuator.

12. The method of claim 10, wherein interfacing the distributed processing equipment comprises installing a plurality of control devices in the one or more networks, each of the control devices having at least one first interface for network communications with the one or more networks and having at least one second interface for local communication with at least one of the installed communication systems.

13. The method of claim 10, wherein obtaining, at the distributed processing equipment from the installed sensing equipment at the wellsites in real time, the operating parameters of each of the artificial lift units comprises communicating the operating parameters of each of the artificial lift units using a combination of the one or more networks and the installed communication systems.

14. The method of claim 10, wherein analyzing, with the modelling functions of the distributed processing equipment, the trends of the operating parameters of the artificial lift units comprises one of: analyzing with physics-based models based on information of the wellsites and the artificial lift units, analyzing with models created on location at the wellsites, and analyzing engineering models configured as a digital representation of the wellsites and artificial lift units.

15. The method of claim 10, wherein predicting, with the automated machine learning of the distributed processing equipment, the conditions of the artificial lift units based on the analyzed trends comprises predicting the conditions of at least one of: an equipment failure of at least one of the artificial lift units; a failure of the well at the wellsite of at least one of the artificial lift units; predicting an inefficiency of at least one of the artificial lift units; and predicting a decline of the well at the wellsite of at least one of the artificial lift units that leads to the deleterious operation of the at least one artificial lift unit.

16. A system for controlling a plurality of artificial lift units at a plurality of wellsites, the artificial lift units including reciprocating rod lift units, the artificial lift units having installed controllers, installed sensing equipment, and installed communication systems, the system comprising:
- communication equipment having network interfaces in communication with one or more networks and having local interfaces in communication with the installed communication systems; and
- distributed processing equipment in communication with the communication equipment, the distributed processing equipment installed at the plurality of the wellsites for the artificial lift units, the distributed processing equipment being configured to:
  - obtain operating parameters of each of the artificial lift units from the installed sensing equipment at the wellsites in real time;
  - analyze, with modelling functions of the distributed processing equipment, trends of the operating parameters of at least the reciprocating rod lift units of the artificial lift units, wherein to analyze the trends for the reciprocating rod lift units, the distributed processing equipment is configured to monitor balance of the reciprocating rod lift units;
  - predict, with automated machine learning of the distributed processing equipment, conditions of at least the reciprocating rod lift units of the artificial lift units based on the analyzed trends, wherein to predict the conditions for the reciprocating rod lift units, the distributed processing equipment is configured to predict deleterious operation of the reciprocating rod lift units in out-of-balance conditions leading to damage of the reciprocating rod lift units based on the monitored balance from the analyzed trends, the deleterious operation requiring a manual correction;
  - determine at least one temporary automated control configured to counteract the predicted conditions of at least the reciprocating rod lift units of the artificial lift units, wherein to determine the at least one temporary automated control for the reciprocating rod lift units, the distributed processing equipment is configured to determine adjustments to the reciprocating rod lift units to counteract the out-of-balance conditions as a remedial correction at least until the manual correction is performed; and
  - implement the at least one temporary automated control with instructions communicated from the distributed processing equipment to the installed controllers of at least the reciprocating rod lift units to regulate output of an actuator of each of the reciprocating rod lift units to adjust a pumping speed configured to counter the out-of-balance conditions.

17. The system of claim 16, wherein to implement the at least one temporary automated control at the reciprocating rod lift units, the instructions are configured to one of: automatically adjust a motor of the actuator, and automatically adjust movable counterwieights of the actuator.

18. The system of claim 16, wherein the distributed processing equipment comprises a plurality of control devices installed in the one or more networks, each of the control devices having at least one first interface for network communications with the one or more networks and having at least one second interface for local communication with at least one of the installed communication systems.

19. The system of claim 16, wherein to analyze, with the modelling functions, the trends of the operating parameters of the artificial lift units, the distributed processing equipment is configured to one of: analyze with physics-based models based on information of the wellsites and the artificial lift units, analyze with models created on location at the wellsites, and analyze engineering models configured as a digital representation of the wellsites and artificial lift units.

20. The system of claim 16, wherein to predict, with the automated machine learning, the conditions of the artificial lift units based on the analyzed trend, the distributed processing equipment is configured to predict the conditions of at least one of: an equipment failure of at least one of the artificial lift units; a failure of the well at the wellsite of at least one of the artificial lift units; predicting an inefficiency of at least one of the artificial lift units; and predicting a decline of the well at the wellsite of at least one of the artificial lift units that leads to the deleterious operation of the at least one artificial lift unit.

21. For a plurality of artificial lift units at a plurality of wellsites, the artificial lift units including reciprocating rod lift units, the artificial lift units having installed controllers, installed sensing equipment, and installed communication systems, a non-transitory programmable storage device having program instructions stored thereon for causing distributed processing equipment to:
- interface the distributed processing equipment with the installed controllers and the installed communication systems at the plurality of the wellsites;
- connect the distributed processing equipment together in one or more networks;
- obtain, at the distributed processing equipment, operating parameters of each of the artificial lift units from the installed sensing equipment at the wellsites in real time;
- analyze, with modelling functions of the distributed processing equipment, trends of the operating parameters of at least the reciprocating rod lift units of the artificial lift units, wherein to analyze the trends for the reciprocating rod lift units, the distributed processing equipment is configured to monitor balance of the reciprocating rod lift units;
- predict, with automated machine learning of the distributed processing equipment, conditions of at least the reciprocating rod lift units of the artificial lift units based on the analyzed trends, wherein to predict the conditions for the reciprocating rod lift units, the distributed processing equipment is configured to predict deleterious operation of the reciprocating rod lift units in out-of-balance conditions leading to damage of the reciprocating rod lift units based on the monitored balance from the analyzed trends, the deleterious operation requiring a manual correction;
- determine, with the distributed processing equipment, at least one temporary automated control to counteract the predicted conditions of at least the reciprocating rod lift units of the artificial lift units, wherein to determine the at least one temporary automated control for the reciprocating rod lift units, the distributed processing equipment is configured to determine adjustments to the reciprocating rod lift units to counteract the out-of-balance conditions as a remedial correction at least until the manual correction is performed; and
- implement the at least one temporary automated control with instructions communicated from the distributed processing equipment to the installed controllers of at least the reciprocating rod lift units to regulate output of an actuator of each of the reciprocating rod lift units to adjust a pumping speed configured to counter the out-of-balance conditions.

* * * * *